US011752436B2

(12) United States Patent
Yoo

(10) Patent No.: US 11,752,436 B2
(45) Date of Patent: *Sep. 12, 2023

(54) SYSTEMS AND METHODS FOR A NETWORK-BASED VIDEO GAME APPLICATION

(71) Applicant: Electronic Arts Inc., Redwood City, CA (US)

(72) Inventor: YoungSeok Yoo, Seoul (KR)

(73) Assignee: Electronic Arts Inc., Redwood City, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/484,562

(22) Filed: Sep. 24, 2021

(65) Prior Publication Data

US 2022/0008831 A1 Jan. 13, 2022

Related U.S. Application Data

(63) Continuation of application No. 16/773,754, filed on Jan. 27, 2020, now Pat. No. 11,154,786.

(51) Int. Cl.
*A63F 13/23* (2014.01)
*A63F 13/795* (2014.01)
*A63F 13/35* (2014.01)

(52) U.S. Cl.
CPC ............ *A63F 13/795* (2014.09); *A63F 13/35* (2014.09)

(58) Field of Classification Search
CPC ........ A63F 13/335; A63F 13/23; A63F 13/25; A63F 13/40; A63F 13/46; A63F 13/80;
(Continued)

(56) References Cited

U.S. PATENT DOCUMENTS

| 4,773,650 A | 9/1988 | Doughty |
| 5,759,419 A | 6/1998 | Hill |

(Continued)

FOREIGN PATENT DOCUMENTS

| CN | 113171608 A | 7/2021 |
| JP | 07204314 A | 8/1995 |

(Continued)

OTHER PUBLICATIONS

Match Attax TV, "Match Attax, How to Play Special", https://www.youtube.com/watch?v=fC6GSIxO_pw, Nov. 26, 2015 (Year: 2015).

*Primary Examiner* — Michael A Cuff
(74) *Attorney, Agent, or Firm* — Knobbe Martens Olson & Bear LLP

(57) ABSTRACT

Embodiments of the systems and methods disclosed herein provide a game that includes at least two users that each have a preconfigured set of playable virtual entities. The users draw playable virtual entities from each of their respective sets of playable virtual entities, and can play the playable virtual entities in one or more battles to facilitate moving a virtual positional marker towards a goal or shooting a goal, wherein the battle procedures are based on a turn priority. Certain attributes are associated with the playable virtual entities so that playable virtual entity effects, OVR values, and salary values can affect which playable virtual entities are in a deck and how the playable virtual entities are affected by the location of the virtual positional marker and/or other playable virtual entities.

20 Claims, 12 Drawing Sheets

(58) Field of Classification Search
CPC .. A63F 13/812; A63F 13/803; A63F 2300/61; A63F 2300/308; A63F 2300/1062
USPC .......................................................... 463/42
See application file for complete search history.

(56) References Cited

U.S. PATENT DOCUMENTS

| | | | |
|---|---|---|---|
| 5,906,370 A | 5/1999 | Poissin | |
| 11,154,786 B2 | 10/2021 | Yoo | |
| 2004/0036220 A1 | 2/2004 | Tanaka | |
| 2005/0020363 A1* | 1/2005 | Kawamoto | G06T 15/20 463/32 |
| 2006/0202423 A1 | 9/2006 | Tanaka | |
| 2006/0214370 A1 | 9/2006 | Schneider | |
| 2007/0013129 A1 | 1/2007 | Laporte | |
| 2007/0173304 A1 | 7/2007 | Mcilvain | |
| 2008/0036150 A1 | 2/2008 | Tucker et al. | |
| 2009/0036185 A1 | 2/2009 | Price | |
| 2009/0179379 A1 | 7/2009 | Banke | |
| 2010/0273549 A1 | 10/2010 | Price | |
| 2011/0065489 A1 | 3/2011 | Fleishman | |
| 2014/0235352 A1 | 8/2014 | Ikeda et al. | |
| 2017/0072292 A1 | 3/2017 | Morikawa | |
| 2019/0080495 A1* | 3/2019 | Andronikos | A63B 71/0622 |
| 2019/0247747 A1 | 8/2019 | Choi | |
| 2022/0141440 A1* | 5/2022 | Arai | H04N 13/332 348/53 |

FOREIGN PATENT DOCUMENTS

| | | |
|---|---|---|
| JP | 2014226564 A | 12/2014 |
| JP | 2015228986 A | 12/2015 |
| KR | 100407438 B1 | 11/2003 |

* cited by examiner

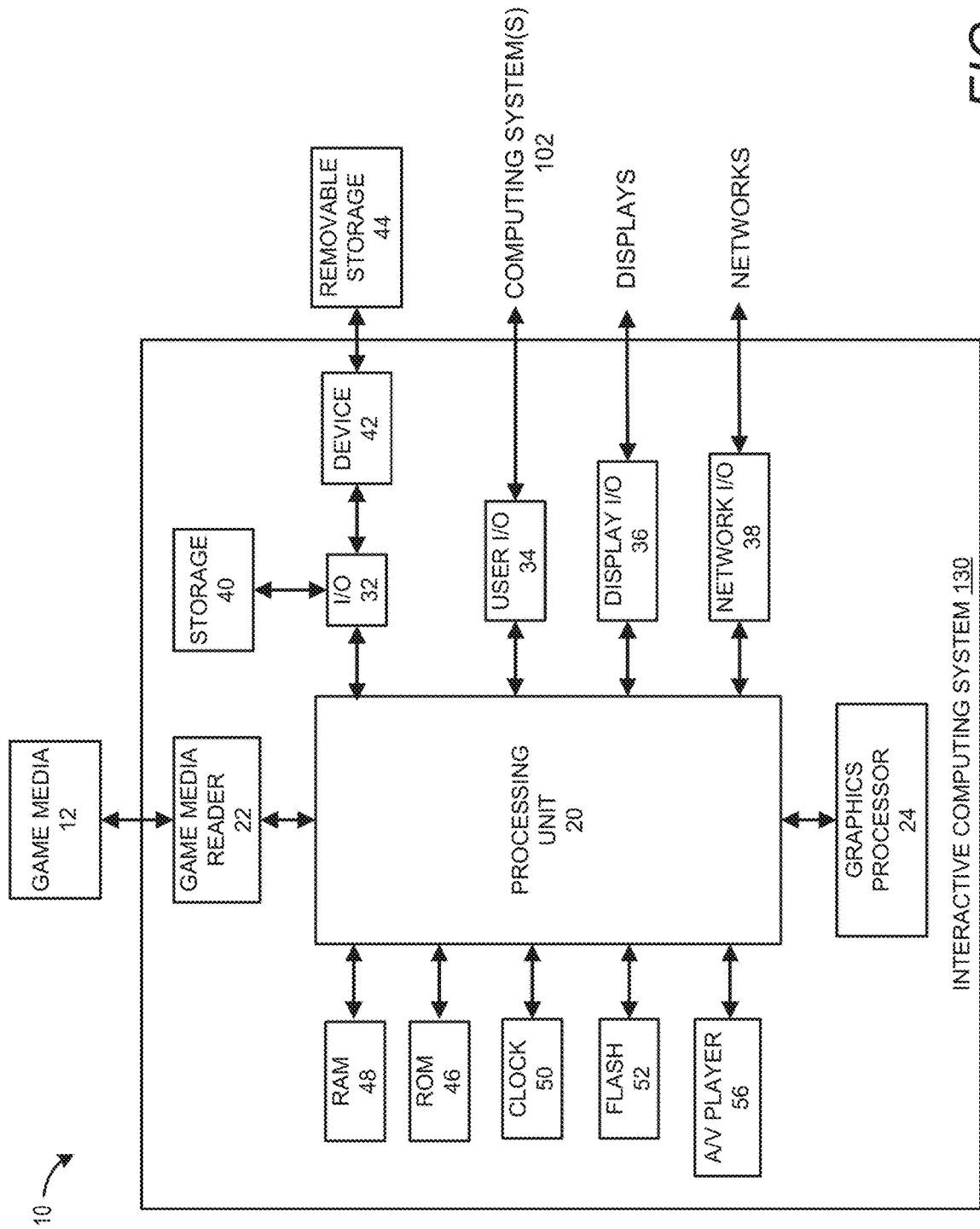

SYSTEMS AND METHODS FOR A NETWORK-BASED VIDEO GAME APPLICATION

RELATED APPLICATIONS

This application is a continuation of U.S. application Ser. No. 16/773,754, filed on Jan. 27, 2020 and titled "SYSTEMS AND METHODS FOR A NETWORK-BASED VIDEO GAME APPLICATION," which is hereby incorporated herein by reference in its entirety.

BACKGROUND

Video games have increased in popularity and complexity in recent years. Additionally, mobile video games, including those using collectible virtual entities (e.g., cards), have also increased in popularity and complexity in recent years. Some of the mobile video games define how, when, and where on a user interface a virtual entity can be placed by a user, and the effect of the placement of such playable virtual entity. However, the field has much more room for growth with many new and exciting game opportunities.

SUMMARY OF EMBODIMENTS

The systems, methods, and devices of this disclosure each have several innovative aspects, no single one of which is solely responsible for the desirable attributes disclosed herein. Details of one or more implementations of the subject matter described in this specification are set forth in the accompanying drawings and the description below.

In one embodiment, a system comprises: one or more hardware databases comprising memory, wherein the memory is configured to store: virtual entity information associated with a plurality of virtual entities; and user profile data associated with a plurality of users, including a first user associated with a first user device that is configured to display a first interactive user interface associated with a video game, and a second user associated with a second user device that is configured to display a second interactive user interface associated with the video game; one or more network interfaces; and one or more processors configured with computer executable instructions that cause the one or more processors to execute a game application for playing a video game, the game application configured to: based on a matching of the first user and second user, facilitate, via the one or more network interfaces, a connection between the first user device and the second user device; determine and assign a turn priority to the first user device; generate and transmit, to the first user device, instructions for display of a first interactive user interface, wherein the first interactive user interface includes a shared portion and a first portion; generate and transmit, to the second user device, instructions for display of a second interactive user interface, wherein the second interactive user interface includes the shared portion and a second portion; receive, from the first user device, a first placement of virtual entities on the shared portion; transmit, to the second user device, instructions for display of the first placement of virtual entities; receive, from the second user device, a second placement of virtual entities on the shared portion; transmit, to the first user device, instructions for display of the second placement of virtual entities; assign the turn priority to the second user device based at least in part on the first placement of virtual entities and the second placement of virtual entities; receive, from the second user device, a request to modify a marker location, wherein the marker location is associated with a location of a virtual positional marker; and based on the request, modify the marker location. The game application of the system is further configured to: determine that a goal is not scored based at least in part on the first selection and second selection; and assign the turn priority to the first user. The game application of the system is further configured to: determine that a goal is scored based at least in part on the first selection and second selection; assign the turn priority to the first user; and modify the marker location to a starting location, wherein the starting location is a location where the virtual positional marker starts in when a game initiates. The game application of the system is further configured to: receive, from the second user device, a goal request; based on the goal request, determine a scoring probability, wherein the scoring probability is based in part at least one virtual entity included in the first placement of virtual entities or the second placement of virtual entities; receive, from the first user device, a first selection of at least one zone, wherein the number of zones available to the first user to select is based at least in part on the goal probability; and receive, from the second user device, a second selection of one zone.

Various embodiments of the system may include one, all, or any combination of the following features: wherein the turn priority is based on possession of the virtual positional marker; wherein the instructions for display of the second interactive user interface do not include the first portion; wherein the second portion is different from the first portion, and wherein the instructions for display of the first interactive user interface do not include the second portion; wherein the instructions for display of the first placement of virtual entities transmitted to the second user device further includes instructions to display the first placement virtual entities face down in the second interactive user interface; wherein the instructions for display of the first placement of virtual entities are transmitted to the second user device prior to receiving the second placement virtual entities on the shared portion from the second user device; wherein the scoring probability is also determined based at least in part on an adjusted rating for each virtual entity placed in the first placement of virtual entities and second placement of virtual entities; wherein the assigned turn priority to the second user based at least in part on the first placement of virtual entities and the second placement of virtual entities is further based at least in part on a determination of an adjusted rating for each virtual entity placed in the first placement of virtual entities and second placement of virtual entities.

In one embodiment, a computer-implemented method comprises: based on a matching of a first user and a second user, facilitating, via one or more network interfaces, a connection between a first user device and a second user device, wherein the first user device is associated with the first user and configured to display a first interactive user interface associated with a video game, and wherein the second user device is associated with the second user configured to display a second interactive user interface associated with the video game; determining and assigning a turn priority to the first user device; generating and transmitting, to the first user device, instructions for display of a first interactive user interface, wherein the first interactive user interface includes a shared portion and a first portion; generating and transmitting, to the second user device, instructions for display of a second interactive user interface, wherein the second interactive user interface includes the shared portion and a second portion; receiving, from the first user device, a first placement of virtual entities on the shared portion; transmitting, to the second user device, instructions for display of the first placement of virtual entities; receiving, from the second user device, a second placement of virtual entities on the shared portion; transmitting, to the first user device, instructions for display of the second placement of virtual entities; assigning the turn priority to the second user device based at least in part on the first placement of virtual entities and the second placement of virtual entities; receiving, from the second user device, a request to modify a marker location, wherein the marker location is associated with a location of a virtual positional marker; and based on the request, modifying the marker location. The method further comprising: determining that a goal is not scored based at least in part on the first selection and second selection; and assigning the turn priority to the first user. The method further comprising: determining that a goal is scored based at least in part on the first selection and second selection; assigning the turn priority to the first user; and modifying the marker location to a starting location, wherein the starting location is a location where the virtual positional marker starts in when a game initiates. The method further comprising: receiving, from the second user device, a goal request; based on the goal request, determining a scoring probability, wherein the scoring probability is based in part at least one virtual entity included in the first placement of virtual entities or the second placement of virtual entities; receiving, from the first user device, a first selection of at least one zone, wherein the number of zones available to the first user to select is based at least in part on the goal probability; and receive, from the second user device, a second selection of one zone.

Various embodiments of the computer-implemented method may include one, all, or any combination of the following features: wherein the turn priority is based on possession of the virtual positional marker; wherein the instructions for display of the second interactive user interface do not include the first portion; wherein the second portion is different from the first portion, and wherein the instructions for display of the first interactive user interface do not include the second portion; wherein the instructions for display of the first placement of virtual entities transmitted to the second user device further includes instructions to display the first placement virtual entities face down in the second interactive user interface; wherein the instructions for display of the first placement of virtual entities are transmitted to the second user device prior to receiving the second placement virtual entities on the shared portion from the second user device; wherein the scoring probability is also determined based at least in part on an adjusted rating for each virtual entity placed in the first placement of virtual entities and second placement of virtual entities; wherein the assigned turn priority to the second user based at least in part on the first placement of virtual entities and the second placement of virtual entities is further based at least in part on a determination of an adjusted rating for each virtual entity placed in the first placement of virtual entities and second placement of virtual entities.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 10 illustrates an embodiment of a hardware configuration for an interactive computing system.

DETAILED DESCRIPTION OF EMBODIMENTS

Overview

Figure 1:
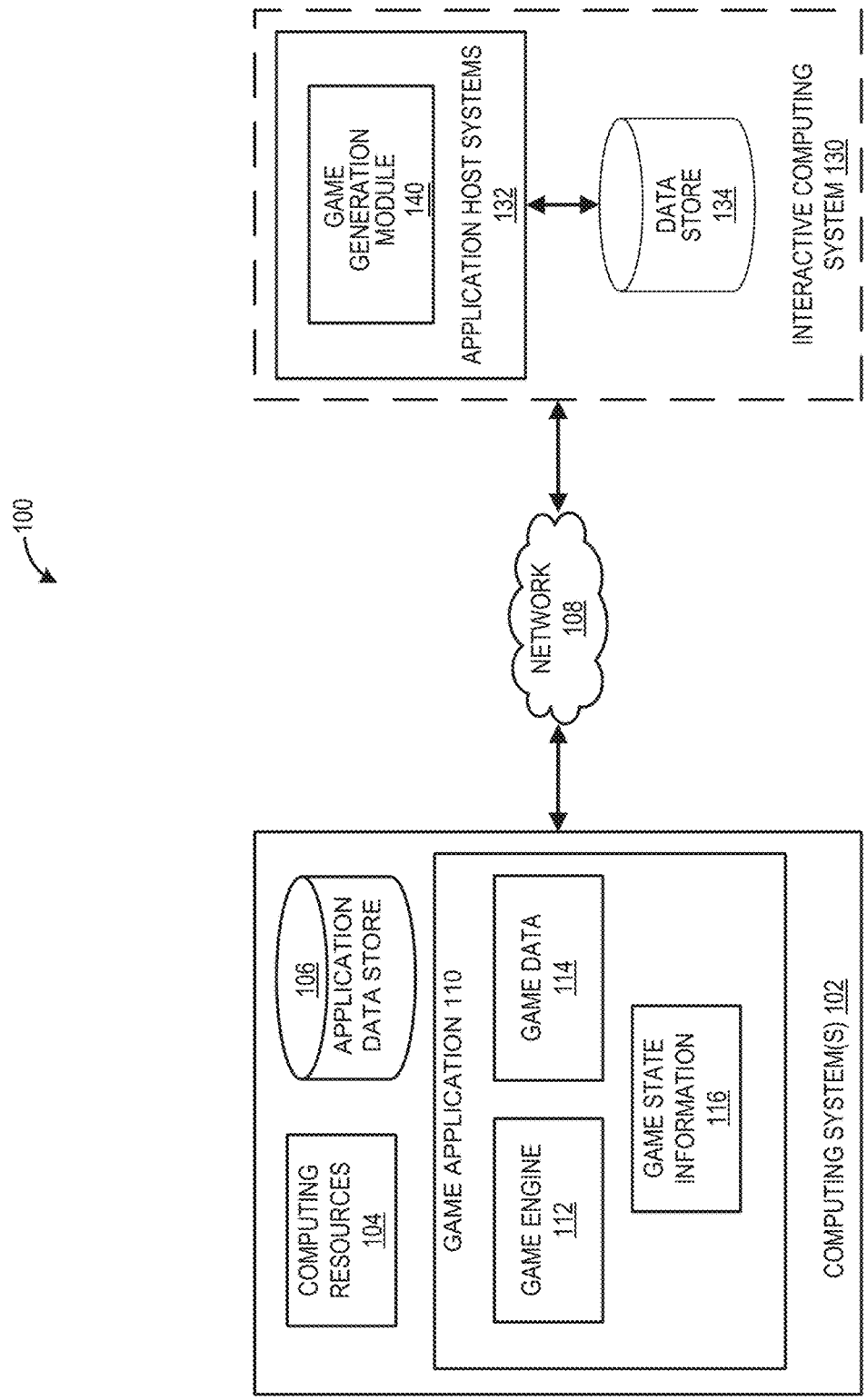
FIG. 1 illustrates an embodiment of a computing environment that can implement one or more embodiments of a video game application.

Mobile video games that use playable virtual entities (e.g., virtual cards or playable virtual entities), such as the examples described herein, can include gameplay mechanics that cannot be used in a real world game. In addition, due to the prevalence and advancement of mobile platforms, new mechanics can be implemented to allow for additional gameplay functionality across devices and with users all over the world. The ability for one or more users to connect over a wireless connection utilizing hardware (e.g., a cell phone or tablet) with advanced processing power, allows for the display of various user interface elements that can adjust based on the playable virtual entities. Further, the examples can be updated with new playable virtual entities, gameplay mechanic adjustments, and user interface adjustments with over-the-air software updates. The ability to hide certain aspects and controls from other users also allows additional functionality to be implemented into the game mechanics.

In some embodiments, game applications, as described herein, can include a plurality of gameplay elements, such as, a field to place the playable virtual entities, a user's hand and/or opponent's hand indicating the playable virtual entities being held, attributes associated with the playable virtual entities, a set of rules for executing the game, as well as other gameplay elements. The user's hand and opponent's hand can include a certain number of playable virtual entities drawn from a set of virtual entities (e.g., a deck). Functions of the playable virtual entities are described in more detail herein, and with respect to FIG. 3.

The game application can also include a field area where playable virtual entities can be placed in order to achieve an action or effect. Playable virtual entities may be used to cause an action or effect on a virtual field of play. The action or effect can progress the status of a gameplay session. The effect of a user's playable virtual entities can result in influencing the opponent, the opponent's playable virtual entities, the field, or the attributes or function of other playable virtual entities associated with the user.

The set of rules can include instructions that dictate the gameplay and how the users, playable virtual entities, and field of play interact. For example, the rules can include mechanics defining how a particular playable virtual entity can affect the field when placed on the field or held in a user or by opponents, the turn of a user, and any other aspect of the gameplay.

For purposes of this disclosure, the term "user" can refer to a person that is operating a computing device in order to control the operation of a game application. For purposes of this disclosure, the term "character" or "player" can refer to a virtual avatar, player, or character that a user can control within a game application. The character or player can be a person, vehicle, robot, creature, object, and/or any entity or item that the user can control within the game application.

Overview

FIG. 1 illustrates an embodiment of a computing environment that can implement one or more embodiments of a video game application. For example, FIG. 1 illustrates an embodiment of a computing environment 100 for implementing a game generation module 140. The environment 100 includes a network 108, a plurality of user computing systems 102 and an interactive computing system 130, which includes application host systems 132 and a data store 134. To simplify discussion and not to limit the present disclosure, FIG. 1 illustrates only one user computing system 102 and one interactive computing system 130, though multiple systems may be used. The user computing system 102 may communicate via a network 108 with the interactive computing system 130. Although only one network 108 is illustrated, multiple distinct and/or distributed networks 108 may exist.

Interactive Computing System

The interactive computing system 130 can include one or more application host systems 132 and a data store 134. The interactive computing system 130 may include one or more computing systems configured to execute a portion of the game application 110. In some embodiments, the one or more application host systems 132 can include one or more computing devices, such as servers and databases that may host and/or execute a portion of one or more instances of the game application 110. In certain embodiments, instead of or in addition to executing a portion of the game application 110, the application host systems 132 may execute another application, which may complement and/or interact with the application 110 during execution of an instance of the application 110, such as the game generation module 140.

Application Host System

The interactive computing system 130 may enable multiple users or computing systems to access a portion of the game application 110 executed or hosted by the interactive computing system 130. The interactive computing system 130 can include a game generation module 140. In some embodiments, the host application system 132 may execute a hosting system for executing various aspects of a virtual environment. In some embodiments, the game application 110 may be a single player game (or against a CPU, for example) in which the interactive computing system 130 provides additional functionality when connected to the instance of the game application 110. For example, the interactive computing system 130 can provide updates, such as updates to characteristics of playable virtual entities or updates to sets of playable virtual entities, to the game application 110 based on aggregated information received from a plurality of users operating the same game application 110. As described in more detail herein, a virtual set of playable virtual entities includes a certain number of playable virtual entities a user can designate as a group to be selected from when playing a game. In some embodiments, the application host system 132 can provide a dedicated hosting service for hosting multiplayer game instances or facilitate the creation of game instances hosted by user computing devices. In some embodiments, the host application system 132 can provide a lobby or other environment for users to virtually interact with one another.

Game Generation Module

The game generation module 140 can be a module or system that is configured to implement embodiments of the network-based video game application disclosed herein. In some embodiments, the computing system 102 can communicate with an interactive computing system 130 and the interactive computing system can include an application host system 132, which may be configured to implement the game generation module 140. The game generation module 140 can be configured to implement the gaming system and can be configured to execute rules associated with the gaming system and be used to generate the various rule sets, virtual profiles, groups, packs, or gameplay rules that are used within the game application. The game generation module 140 can provide playable virtual entity information to the game application 110. In some embodiments, the game generation module 140 may update aspects of a gaming system. For example, an update may be provided to the game application when it loads. In some instances, it can be provided prior to loading, stored, and then executed by the game application 110 when the game loads. Aspects of the operation of the game generation module 140 are discussed in more detail below.

Data Store

The interactive computing system 130 can include one or more data stores (e.g., data store 134) that are configured to store playable virtual entity information or information associated one or more sets of playable virtual entities (e.g., deck information) that are associated with game application 110 hosted by the interactive computing system 130 and/or the application host systems 132. The data store 134 can include playable virtual entity information or information associated with sets of playable virtual entities that are associated with the game application 110 that is generated and/or aggregated by the game generation module 140. For example, the data store 134 can include the various rule sets, virtual profiles, groups, packs, or gameplay rules that are used within the game system of game application, and/or other information used by the game generation module 140.

Computing System

The computing system 102 includes computing resources 104 and an application data store 106. The user computing system 102 may have varied local computing resources 104 such as central processing units and architectures, memory, mass storage, graphics processing units, communication network availability and bandwidth, and so forth. Further, the user computing system 102 may include any type of computing system. For example, the user computing system 102 may be any type of computing device, such as include a game device, a smart phone, a tablet, a personal computer, a laptop, a smart television, a car console display, a server, and the like. A more detailed description of an embodiment of a computing system 102 is described below with respect to FIG. 10.

Game Application

The user computing system 102 can execute a game application 110 based on software code stored at least in part in the application data store 106. The game application 110 may also be referred to as a videogame, a game, game code and/or a game program. A game application 110 should be understood to include software code that a computing device 102 can use to provide a game for a user to play. A game application 110 may comprise software code that informs a computing device 102 of processor instructions to execute, but may also include data used in the playing of the game, such as data relating to constants, images, playable virtual entity or profile information, or other data structures. In the illustrated embodiment, the game application 110 includes a game engine 112, game data 114, and game state information 116.

In some embodiments, the user computing system 102 is capable of executing a game application 110, which may be stored and/or executed in a distributed environment. For example, the user computing system 102 may execute a portion of a game and the application host system 132, may execute another portion of the game. For instance, the game may be a multiplayer online game that includes a client portion executed by the user computing system 102 and a server portion executed by one or more application host systems 132.

The game application 110 can perform various functions during runtime to execute gameplay sessions between users within the game application. The game application 110 can use playable virtual entity information or profile information received from the interactive computing system 130 to perform various virtual profile functions. The game application 110 may receive playable virtual entity information or profile information from the interactive computing system 130 prior to execution of the game application, such as an update to the game application. The game application 110 may receive playable virtual entity information or profile information from the interactive computing system 130 during runtime. In such embodiments, the game application 110 may dynamically update the playable virtual entity information or profile information within the game application 110 based on the information received from the interactive computing system 130 during runtime. Functions of the game application 110 can include executing rules associated with the virtual profile processes, implementing various rule sets, virtual profiles, groups, packs, or gameplay rules that are used by the game application 110 during runtime, or other functions within the virtual environment. Various aspects of the operation of the game application 110 are described in further detail below.

Game Engine

The game engine 112 can be configured to execute aspects of the operation of the game application 110 within the computing device 100. Execution of aspects of gameplay within a game application 110 can be based, at least in part, on the user input received, the game data 114, and game state information 116. The game data 114 can include game rules, playable virtual entity information or profile information, prerecorded motion capture poses/paths, environmental settings, constraints, skeleton models, and/or other game application information.

The game engine 112 can execute gameplay within the game according to the game rules. Examples of game rules can include rules for scoring, shooting goals, battles, taking turns, drawing playable virtual entities, playing or placing playable virtual entities, user effects (e.g., user-based buffs or debuffs), playable virtual entity effects (e.g., playable virtual entity-based buffs or de-buffs), possible inputs, actions/events, movement in response to inputs, and the like. Other components can control what inputs are accepted and how the game progresses, or other aspects of gameplay. The game engine 112 can receive the user inputs and determine in-game events, such as selection of playable virtual entities during a battle, selection of location to move a virtual positional marker (e.g., a ball) after winning a battle, placement of playable virtual entities, kicks towards the goal, blocking a shot, and other events appropriate for the game application 110. During runtime operation, the game engine 112 can read in game data 114 and game state information 116 to determine the appropriate in-game events, such as implementing a battle process during runtime of the game application. Battles are described in more detail below with respect to FIGS. 5-7.

Game Data

The game data 114 can include game rules, prerecorded motion capture poses/paths, environmental settings, environmental objects, constraints, skeleton models, playable virtual entity information or profile information, and/or other game application information. At least a portion of the game data 114 can be stored in the application data store 106. In some embodiments, a portion of the game data 114 may be received and/or stored remotely, such as in the data store 134, in such embodiments, game data may be received during runtime of the game application.

Game State Information

During runtime, the game application 110 can store game state information 116, which can include a game state, character states, environment states, scene object storage, playable virtual entity information or profile information and/or other information associated with a runtime state of the game application 110. For example, the game state information 116 can identify the state of the game application 110 at a specific point in time, such as the placement of playable virtual entities for a battle during a battle process, playable virtual entity position, playable virtual entity type, field type, playable virtual entity bonus(es), virtual positional marker location, or other information contributing to a state of the game application. The game state information can include dynamic state information that continually changes, such as a virtual positional marker position, field status, or static state information, such as the identification of a game level within the game.

Virtual Environment

As used herein, a virtual environment may include a simulated environment (for example, a virtual space) instanced on a user computing system 102, a server (for example, the interactive computing system 130) that is accessible by a client (for example, user computing system 102) located remotely from the server, to format a view of the virtual environment for display to a user of the client. The simulated environment may have a topography, express real-time interaction by the user, or include one or more objects positioned within the topography that are capable of locomotion within the topography. In some implementations, the topography may be a two-dimensional topography. In other instances, the topography may be a three-dimensional topography. In some implementations, the topography may be a single node. The topography may include dimensions of the virtual environment, or surface features of a surface or objects that are "native" to the virtual environment. In some implementations, the topography may describe a surface (for example, a ground surface) that runs through at least a substantial portion of the virtual environment. In some implementations, the topography may describe a volume with one or more bodies positioned therein (for example, a simulation of gravity-deprived space with one or more celestial bodies positioned therein). A virtual environment may include a virtual world, but this is not necessarily the case. For example, a virtual environment may include a game space that does not include one or more of the aspects generally associated with a virtual world (for example, gravity, a landscape, etc.). By way of illustration, the well-known game Tetris may be formed as a two-dimensional topography in which bodies (for example, the falling tetrominoes) move in accordance with predetermined parameters (for example, falling at a predetermined speed, and shifting horizontally or rotating based on user interaction).

The game instance of the video game 110 may include a simulated virtual environment, for example, a virtual environment that is accessible by users via clients (for example, user computing systems 102) that present the views of the virtual environment to a user. The virtual environment may have a topography, express ongoing real-time interaction by one or more users or include one or more objects positioned within the topography that are capable of locomotion within the topography. In some instances, the topography may include a two-dimensional topography. In other instances, the topography may include a three-dimensional topography. The topography may include dimensions of the space or surface features of a surface or objects that are "native" to the space. In some instances, the topography may describe a surface (for example, a ground surface) that runs through at least a substantial portion of the space. In some instances, the topography may describe a volume with one or more bodies positioned therein (for example, a simulation of gravity-deprived space with one or more celestial bodies positioned therein). The instance executed by the computer components may be synchronous, asynchronous, or semi-synchronous.

It should be understood the above description of the manner in which state of the virtual environment associated with the video game is not intended to be limiting. The game application 110 may be configured to express the virtual environment in a more limited, or richer, manner. For example, views determined for the video game representing the game state of the instance of the video game may be selected from a limited set of graphics depicting an occurrence in a given place within the video game. The views may include additional content (for example, text, audio, pre-stored video content, or other content) that describes particulars of the current state of the place, beyond the relatively generic graphics. For example, a view may include a generic battle graphic with a textual description of the opponents to be confronted. Other expressions of individual places within the video game are contemplated.

The game engine 112 generates game state data 118 that may be used locally within the game application 110 and may be transmitted to the interactive computing system 130 over network 108. The execution of the instance of the game application 110 may include determining a game state associated with the game application 110. The game state data 118 may facilitate presentation of views of the video game to the users on the user computing systems 102. The game state data 118 may include information defining the virtual environment in which the video game is played. The execution of the game engine is described in further detail herein.

The execution of the game instance may enable interaction by the users with the game application 110 or other users through the interactive computing system 130. The game application 110 may be configured to perform operations in the game instance in response to commands received over network 108 from user computing systems 102. In some embodiments, users may interact with elements in the video game or with each other through the video game.

Users may participate in the video game through client game applications 110 implemented on user computing systems 102 associated with the users. Within the game instance of the video game executed by the game engine 112, the users may participate by controlling one or more of an element in the virtual environment associated with the video game. The user-controlled elements may include avatars, user characters, virtual environment units (for example, troops), objects (for example, weapons, horses, vehicle and so on), simulated physical phenomena (for example, wind, rain, earthquakes, or other phenomena), or other user-controlled elements.

The user-controlled character avatars may represent the users in the virtual environment. The user characters may include heroes, knights, commanders, leaders, generals or any other virtual environment entities that may possess strength, skills, abilities, magic powers, knowledge, or any other individualized attributes. The virtual environment units controlled by the user may include troops or any other game entities that may be trained, recruited, captured, or otherwise acquired by the users in groups or en-mass. The objects controlled by the users may include weapons, vehicles, projectiles, magic items, wardrobes, boots, armor, knapsacks, medicine, healing potion, or any other virtual items that may be employed by the users for interaction within the video game.

The user-controlled element(s) may move through and interact with the virtual environment (for example, user-virtual environment units in the virtual environment, non-user characters in the virtual environment, other objects in the virtual environment, or the like). The user-controlled elements controlled by or associated with a given user may be created or customized by the given user. The user may have an "inventory" of virtual goods or currency that the user can use (for example, by manipulation of a user character or other user controlled element, or other items) within the virtual environment.

Controls of virtual elements in the video game may be exercised through commands input by a given user through user computing systems 102. The given user may interact with other users through communications exchanged within the virtual environment. Such communications may include one or more of textual chat, instant messages, private messages, voice communications, or other communications. Communications may be received and entered by the users via their respective user computing systems 102. Communications may be routed to and from the appropriate users through server(s) (for example, through application host system 132).

Execution or performance of the user action by the game engine 112 may produce changes to the game state, which may reflect progresses or results of the user actions. In some examples, state changes caused by the execution of the user actions may be recorded in the application data store 106 or data store 134 to facilitate persistency throughout the instance of the video game. In some examples, execution of the user actions may not produce persistent changes to the game state (for example, a user character jumping forward and backward successively may not produce any perceivable game state changes to other users).

A given user may input commands with specific parameters to undertake specific deeds, actions, functions, spheres of actions or any other types of interactions within the virtual environment. For example, the given user may input commands to construct, upgrade or demolish virtual buildings; harvest or gather virtual resources; heal virtual user-controlled elements, non-player entities or elements controlled by other users; train, march, transport, reinforce, reassign, recruit, or arrange troops; attack, manage, create, demolish or defend cities, realms, kingdoms, or any other virtual environment locations controlled by or associated with the users; craft or transport virtual items; interact with, compete against or along with non-player entities or virtual environment elements controlled by other users in combats; research technologies or skills; mine or prospect for virtual resources; complete missions, quests, or campaigns; exercise magic power or cast spells; or perform any other specific deeds, actions, functions, or sphere of actions within the virtual environment. In some examples, the given user may input commands to compete against elements in an environment within the virtual environment—for example, Player vs. Environment (PvE) activities. In some examples, the given user may input commands to compete against each other within the virtual environment—for example, Player vs. Player (PvP) activities.

The instance of the video game may include virtual entities automatically controlled in the instance of the video game. Such virtual entities may or may not be associated with any user. As such, the automatically controlled virtual entities may be generated or developed by artificial intelligence configured with the game application 110 or server(s) interactive computing system 130 by a provider, administrator, moderator, or any other entities related to the video game. These automatically controlled entities may evolve within the video game free from user controls and may interact with the entities controlled by or associated with the users, other automatically controlled virtual environment entities, as well as the topography of the virtual environment. Certain manifested traits may be associated with the automatically controlled entities in accordance with the artificial intelligence configured with server(s) (for example, application host system 132). As used herein, such automatically controlled virtual environment entities in the instance of the video game are referred to as "non-player entities."

In an online game, the instance of the video game may be persistent. That is, the video game may continue on whether or not individual users are currently logged in or participating in the video game. A user that logs out of the video game and then logs back in some time later may find the virtual environment or the video game has been changed through the interactions of other users with the video game during the time the user was logged out. These changes may include changes to the simulated physical space, changes in the user's inventory, changes in other users' inventories, changes experienced by non-user characters, or other changes.

Interactive Computing System

The interactive computing system 130 may include application host system(s) 132, a data store 134, and a tournament management system 120. The interactive computing system 130 may include one or more computing systems configured to execute a portion of the game application 110. The interactive computing system 130 may enable multiple users or computing systems to access a portion of the game application 110 executed or hosted by the interactive computing system 130. The interactive computing system 130 can have one or more game servers that are configured to host online video games. For example, the interactive computing system 130 may have one or more game servers that are configured to host an instanced (for example, a first person shooter multiplayer match) or a persistent virtual environment (for example, a multiplayer online roll playing game). The virtual environment may enable one or more users to interact with the environment and with each other in a synchronous or asynchronous manner. In some cases, multiple instances of the persistent virtual environment may be created or hosted by one or more game servers. A set of users may be assigned to or may access one instance of the virtual environment while another set of users may be assigned to or may access another instance of the virtual environment. In some embodiments, the interactive computing system 130 may execute a hosting system for executing various aspects of a game environment. For example, in one embodiment, the game application 110 may be a competitive game, such as a first person shooter or sports game, and the interactive computing system 130 can provide a dedicated hosting service (such as, through the game servers) for hosting multiplayer game instances or facilitate the creation of game instances hosted by user computing devices.

Network

The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

Virtual Game Process

Figure 2:
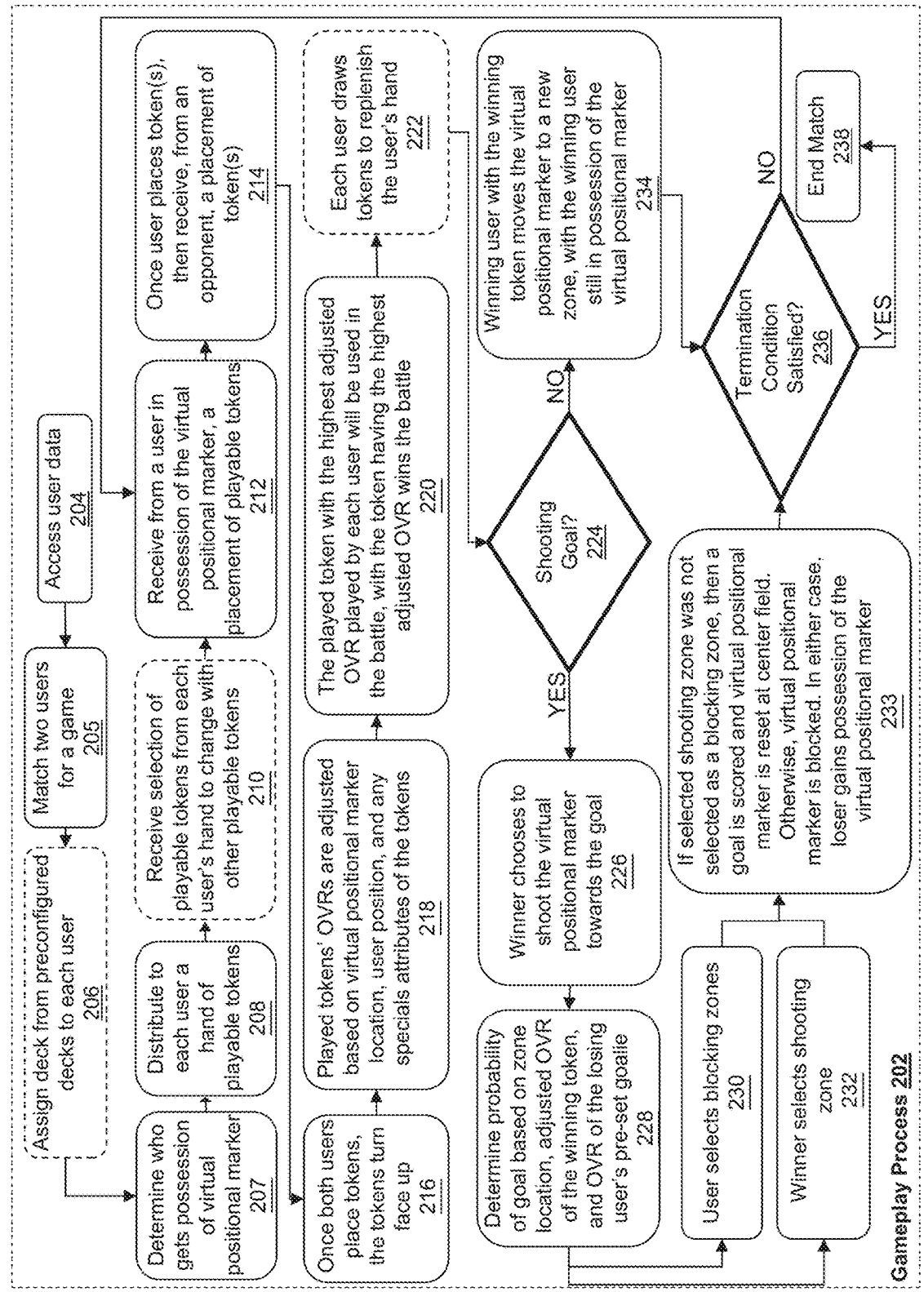
FIG. 2 illustrates an embodiment of a flowchart of a gameplay process as run by a system for executing a gameplay session with playable virtual entities within a virtual environment of a game application.

FIG. 2 illustrates an embodiment of a flowchart of a gameplay process 202 as run by a system (e.g., the interactive computing system 130) for executing a gameplay session with playable virtual entities within a virtual environment of a game application. The gameplay process 202 can be implemented by any system that can generate instances of the game application. For example, the gameplay process 202, in whole or in part, can be implemented by a game application 110, a game engine 114, an interactive computing system 130, an application host system 132, a game generation module 140, and/or another system. Although any number of systems, in whole or in part, can implement the gameplay process 202, to simplify discussion, the gameplay process 202 will be described with respect to particular systems. Further, although embodiments of the gameplay process 202 may be performed with respect to variations of systems comprising various game application environments, to simplify discussion, the gameplay process 202 will be described with respect to the interactive computing system 130.

At block 204, the interactive computing system 130 can access user data, or user profile data associated with each user of the interactive computing system 130. For example, some or all of the matching criteria discussed below at block 205 can be collected and stored with the user data (e.g., a user's physical location, a user's default or primary language, a user's preconfigured location or region, a user's internet connection speed, a user device's processing power, a user's device information (e.g., operating system, processor speed, display type, or the like), a user's gameplay data (e.g., win rate, lose rate, win/lose rate associated with specific fields or sets of playable virtual entities (e.g., decks) used by the user or an opponent, or the like), the amount of time passed from the initiation of a request to match, a gameplay mode for the requested match, or any other preconfigured preferences or user-related data). In some embodiments, the user data comprises information related to preconfigured sets of playable virtual entities (e.g., decks), as configured by the respective user. In some embodiments, the user data comprises information related to user profiles, win-lose information, matchmaking preferences, or the like. User data can be stored in a data store, such as the data store 134 the application data store 106, or any other network or local data store. In some embodiments, user data can be used to match users with other users when setting up a game. In some embodiments, user data can be downloaded or pulled from a third party database (e.g., Facebook, Google, Twitter, Snapchat, other game databases, or the like) and stored with any other user data. Such data can be downloaded or pulled with the use of APIs, or other similar solution. In some embodiments, a user must provide permission to access any third party data.

At block 205, the interactive computing system 130 can match two users for a game match. Matching criteria can be used to match users for game matches. The matching criteria may include one or more of the following matching factors: a user's physical location, a user's default or primary language, a user's preconfigured location or region, a user's internet connection speed, a user device's processing power, a user's device information (e.g., operating system, processor speed, display type, or the like), a user's gameplay data (e.g., win rate, lose rate, win/lose rate associated with specific fields or decks used by the user or an opponent, or the like), the amount of time passed from the initiation of a request to match, a gameplay mode for the requested match, or any other relevant criteria for matching. The matching criteria or matching factors can also be weighted to improve the quality of the matches (e.g., adjustments can be made based on games played or any other user-related data), or weighted over time (e.g., if a user is waiting a long time to be matched, the criteria weightings can be adjusted to allow for a less stringent matching and allow the user to match with a broader range of other users).

In some embodiments, three users, four users, or more can be matched. In some embodiments, one user can be matched with a CPU user, controlled by an artificial intelligence engine or machine-learning algorithm. In some embodiments, matching of users can also be performed by an artificial intelligence engine or machine-learning algorithm.

In some embodiments, a virtual arena or field for the game match can also be determined by the interactive computing system 130. For example, various virtual locations that exist in the real world for a particular type of sport being played can be emulated by the game application and used as the virtual environment for the game match.

At block 206, optionally, the interactive computing system 130 can assign a virtual deck from one or more decks previously configured by each of the users. This block may be optional and a user can be automatically assigned a preconfigured deck that had been chosen by a user prior to beginning of a game. In some embodiments, virtual decks can be configured by the interactive computing system 130 automatically or by other users. In some embodiments, users can designate a default deck to be played with. In some embodiments, users can designate which decks to play in based on game type or game mode, or the like. The decks can be designed and created from a pool of playable virtual entities prior to matching or playing a game. For example, there can be a pool of playable virtual entities, which may include a number of playable virtual entities fewer than, equal to, or more than a required number for a deck. In some embodiments, multiples of the same playable virtual entity may be added to a deck. In some embodiments, a deck can consist of any number of playable virtual entities. In some embodiments, the number of playable virtual entities in a deck can be set at 10, 20, 30, or the like. In some embodiments, the number of playable virtual entities in a deck can approximate the number of players on a team for a particular sport the game is emulating. For example, for a soccer team, the deck can be set to 20 playable virtual entities. However, in some embodiments, a deck for a soccer game can be less than or greater than 20 playable virtual entities. In some embodiments, the decks can be designed from a pool of playable virtual entities that exceed the number of playable virtual entities a deck is limited to. For example, the pool of playable virtual entities can be as large as 100, 200, 500, 1000 or more playable virtual entities. In some embodiments, playable virtual entities in the pool of playable virtual entities can be available to a user to choose from for a limited time, once certain game challenges are completed, or based on other criteria limiting availability.

In some embodiments, rules and requirements can also be imposed on deck creation. For example, a certain point value, or salary (e.g., salary value 304 in FIG. 3), can be assigned to each playable virtual entity. In some embodiments, a deck can be limited in quantity, as mentioned above, and limited by total salary of all playable virtual entities in the deck. For example, the salary of each playable virtual entity in a deck can be added together to yield a total salary. The interactive computing system 130 can then impose a limit, or salary cap, for the decks so that the total salary is less than or equal to the salary cap. In some embodiments, the salary cap can vary based on game type (e.g., tournament mode, ranked game, unranked game, friendly game, or the like), when the game is played (e.g., during a weekend or holiday, or the like), based on user ranking, or based on user profile status (e.g., whether the profile is a standard profile, or the like), for example. In some embodiments, the salary cap is set and cannot be adjusted or changed. The salary cap results in users having to decide which expensive playable virtual entities, or playable virtual entities with high salaries, and which cheap playable virtual entities, or playable virtual entities with low salaries, to include in the deck so that the salary cap is not exceeded. It may be desired for a user to meet the salary cap, however, in some embodiments, a user may design a deck that has a total salary less than the salary cap.

At block 207, the interactive computing system 130 determines which user goes first, or whose turn it will be to go first, by determining which user gets possession of a virtual positional marker. For example, the interactive computing system 130 can determine which user will have initial possession of the virtual positional marker when a match or game begins. In some embodiments, a simulated coin flip or other representation of a random number generator can be used to determine who goes first. In some embodiments, whose turn it is can be dependent on user ranking, who joined the game first, who hosted the game, or other criteria. In some embodiments, a first playable virtual entity is drawn from each deck and compared to see which playable virtual entity has the highest overall rating (OVR) (e.g., default OVR), and the user with the playable virtual entity having the highest OVR will get initial possession of the virtual positional marker.

At block 208, the interactive computing system 130 assigns playable virtual entities to each user from each user's deck and distribute the playable virtual entities into each user's hand so that each user can view the front of the playable virtual entities for their own respective hands. In some embodiments, each user can also view the back of the playable virtual entities of their opponent. This may be useful to determine the number of playable virtual entities available to play by the users.

At block 210, in some embodiments, the interactive computing system 130 can receive instructions from each of the users indicating which of the playable virtual entities in the users' hands should be replaced with other playable virtual entities remaining in each of the user's respective decks. In some embodiments, the interactive computing system 130 can facilitate a mulligan. For example, in games with playable virtual entities, a mulligan refers to the process of adjusting which playable virtual entities are in a user's initial hand of playable virtual entities. In some embodiments, the mulligan can allow a user to put his or her playable virtual entities back into his or her deck, shuffle, and draw a new hand. In some embodiments, a partial mulligan can be facilitated, in which users may choose which playable virtual entities in their opening hands to keep and which ones they want to discard. Each user discards these playable virtual entities at the same time and draw a new playable virtual entity from their deck for each discarded playable virtual entity. In some embodiments, a limit can be imposed on the number of playable virtual entities that can be discarded and replaced. For example, an initial hand may include seven playable virtual entities and each user may be permitted to discard and replace only three of the seven playable virtual entities.

At block 212, the interactive computing system 130 receives from the user that has possession of the virtual positional marker (e.g., as determined at blocks 207, 232, or 234, for example) a placement of playable virtual entities (e.g., zero to three playable virtual entities) on a virtual battlefield (e.g., a virtual table, or the like) face down to be used in a battle. In some embodiments, for example, if the opponent just moved the virtual positional marker from one zone to another zone at block 234, then the opponent will remain in possession of the virtual positional marker as the gameplay process 202 loops back to block 212. In another example, if the opponent scores a goal or a shot by the user is blocked at block 232, then the possession of the virtual positional marker changes to the user, and at block 212, the user will place playable virtual entities first.

At block 214, once the user places up to a defined number of playable virtual entities (e.g., zero to three playable virtual entities) on the virtual battlefield, the interactive computing system 130 then receives from the opponent a placement of up to a defined number of playable virtual entities face down on the virtual battlefield. In some embodiments, there is no resource cost in placing playable virtual entities.

At block 216, once both users have placed their respective playable virtual entities on the virtual battlefield face down, the interactive computing system 130 turns the playable virtual entities face up at the same time so that both users can view the front of the playable virtual entities. In some embodiments, if a user places zero playable virtual entities down then they pass the turn and lose the battle, and the other user will take a turn moving the virtual positional marker or shooting.

At block 218, the interactive computing system 130 updates an overall rating (OVR) associated with the placed down playable virtual entities by comparing the playable virtual entities placed by the user at block 212 with the playable virtual entities placed by the opponent at block 214, as well as any playable virtual entity effects associated with the placed down playable virtual entities or other user effects. In some embodiments, an OVR can be used to compare playable virtual entities with each other such that a higher OVR is desired to win the battle or round. In some embodiments, the OVR can be limited between a particular range so that users can have an easier time calculating additions, subtractions, multiplications, or divisions of the OVR associated with each playable virtual entity, as it is affected by playable virtual entity effects, user effects, or field state position. For example, the range of 5 to 15 OVR can result in simpler calculations to increase user satisfaction and reduce potential frustrations. In some embodiments, having a base OVR rating higher than zero can also be beneficial to avoid potential issues with applying playable virtual entity effects or user effects that reduce OVR, for example. In some embodiments, other ranges of OVR can be used.

In some embodiments, the interactive computing system 130 updates the placed down playable virtual entities of the user by updating the OVR of the playable virtual entities placed by the user at block 212 based on attributes of the same playable virtual entities, for example. Similarly, the interactive computing system 130 updates the placed down playable virtual entities of the opponent by updating the OVR of the playable virtual entities placed by the opponent at block 214 based on attributes of the same playable virtual entities, for example. In some embodiments, a user's playable virtual entities can affect the other user's playable virtual entities as well depending on the particular playable virtual entity effects. For example, a playable virtual entity effect can affect the OVR based on a field state position. For example, playable virtual entities (e.g., defense tokens, midfield tokens, forward tokens, or goalie tokens, regular tokens, or playable virtual entities with a combination of location-based attributes) can have a different OVR rating based on the user and the position of the virtual positional marker at the time a playable virtual entity is being played in a battle or when shooting a goal. For example, the virtual positional marker may be close to a first user's goal so the first user would want to use defense entities to get an OVR bonus and a second user playing against the first user would want to use offense entities to get an OVR bonus since the position of the virtual positional marker is relative to each player with respect to whether they are on the offensive or not. Also, in an example, if a defense token has a default OVR of 7 and a field state position bonus (e.g., for a defense position of the virtual positional marker) OVR of 10. If the defense token is placed in a position that would provide a bonus token effect (e.g., when the virtual positional marker is in the defense field state position and the playable virtual entity is used in a battle), then the field state position OVR of 10 is applied for the battle instead of the default OVR of 7. In some embodiments, if the same defense token that has a default OVR of 7, can also have a field state position reduced OVR of 5 (e.g., for a forward position of the virtual positional marker). If the defense token is placed in a forward position (e.g., when the virtual positional marker is in the forward field state position and the playable virtual entity is used in a battle), then the field state position reduced OVR of 5 is applied for the battle instead of the default OVR of 7 or the field state bonus OVR or 10. Further, in some embodiments, possession of the virtual positional marker can also result in an OVR bonus or reduction.

In some embodiments, there can be a plurality of zones on a field and the zones can affect the field state for that position, or the field state position. For example, for a soccer game, there can be 15 zones. In some embodiments, each row and/or each zone can have its own field state. In some embodiments, the row with three zones farthest from the user would be a forward position field state for that user; so that when a virtual positional marker is in one of these zones then the field state position would be for a forward for that user. The same row, however, would be a defense position field state for the opposing user because from their point of view, they would be defending and the row would be closest to the opposing user. The second to farthest row with three zones from the user would be a mixed forward and midfield position field state. The middle row, third farthest from the user, with three zones would be a midfield position field state. The second closest row with three zones would be a mixed defense and midfield field state. Finally, the closes row would be a defense field state. So, if a virtual positional marker is in one of these rows in one of the zones then the particular field state would apply to playable virtual entities placed in battles and/or when shooting a goal. The description associated with FIG. 4 includes more details on this concept.

In some embodiments, the playable virtual entities have certain playable virtual entity effects (e.g., buffs or de-buffs, or the like). These playable virtual entity effects can be applied to playable virtual entities that have been played by the participant users of the game (e.g., during a battle, one playable virtual entity can affect other playable virtual entities played by any of the participant users of the game prior to determining the victor of the battle), playable virtual entities that are being held by each of the users (e.g., bonuses to OVR based on position of the virtual positional marker may be reduced or increased), field states (e.g., a midfield position may be temporarily classified as a forward position for the sake of OVR bonuses), or the like. In some embodiments, the playable virtual entity effects can affect the OVR based on the playable virtual entity's specific attributes (e.g., team, player, playable virtual entity effect, or the like), time in game that the playable virtual entity is being played, whether the playable virtual entity is held or in play by any user, position of the virtual positional marker, time passed in the game, number of goals scored, whether a goal is being shot, or any similar scenario. In some embodiments, playable virtual entity effects can also affect a user's ability to play a playable virtual entity or even take a turn. In some embodiments, playable virtual entity effects can affect a user's changes in scoring or blocking a goal. In an example, if a playable virtual entity has a default OVR of 7 and a field state position OVR of 10, certain bonuses or playable virtual entity effects can result in adjusting the playable virtual entity to an OVR of 12 instead of 10 if the field state position is satisfied, reduce the bonus to zero (e.g., make the OVR the default OVR of 7 instead of 10), or deduct from the default OVR (e.g., make the OVR 4 instead of 10), depending on the playable virtual entity effect being used. The OVR adjustments and field state concepts as applied to battles are described in more detail with respect to FIGS. 4-8C.

In some embodiments, users can also activate one or more user effects. For example, user effects may affect one or more users, as opposed to playable virtual entities. In some embodiments, a user may be limited in some way (e.g., the user can only play one to two playable virtual entities in a battle instead of three, the user can only play defense tokens for a battle, all playable virtual entities played by the user can come with reduced OVR, certain playable virtual entities can be removed from a user's hand or deck, or the like). In some embodiments, a user may be boosted in some way (e.g., any playable virtual entity the user plays can have extra OVR added, defense tokens the user plays can have its OVR boosted, the user can have an increased chance to score a goal from the particular virtual positional marker position, the user can move the virtual positional marker an extra zone, the user can move the virtual positional marker twice, certain playable virtual entities can be added to user's hand or deck, or the like).

At block 220, the interactive computing system 130 compares the adjusted OVR of the playable virtual entities played by the users at blocks 212 and 214 to determine the playable virtual entity with the highest adjusted OVR for each user. Then, the interactive computing system 130 will compare the playable virtual entities each user plays to determine the playable virtual entity with the highest adjusted OVR for each user. The playable virtual entities with the highest adjusted OVR for each user are compared to determine which user wins the battle, so that the user with the playable virtual entity having the highest OVR will win the battle. In some embodiments, for example, the playable virtual entities remaining for each user (e.g., the playable virtual entities that do not have the highest OVR) can be used for playable virtual entity effects that may influence the OVR of one or more of the user's playable virtual entities that were played in the battle.

At block 222, the interactive computing system 130 allows each user to draw additional playable virtual entities to replace the number of playable virtual entities played to replenish each user's hand. The played playable virtual entities are then discarded and can either be put on the bottom of the deck to be drawn again later, put in a discard pile to then shuffle when the draw pile from the deck is depleted, or removed from the game for the remainder of the game. For example, if a deck is depleted and there are no more playable virtual entities to draw, the discard pile can be shuffled and then playable virtual entities can be drawn from the shuffled deck. In some embodiments, block 220 can be optional and/or can occur after blocks 220, 234, 226, 228, 230, 232, for example.

At block 224, the interactive computing system 130 determines whether the winner wants to shoot a goal. For example, the winner that has the highest adjusted OVR overall (as determined at block 220, for example) can decide whether to kick a goal or move the virtual positional marker to a new zone.

If the winner does not want to shoot a goal and wants to move the virtual positional marker to a new zone, then at block 234, the winner can select a new zone to move the virtual positional marker to as desired by the winner. In some embodiments, the new zone must be adjacent to the zone where the virtual positional marker is currently located. For example, the new zone can be to the left, right, above, or below the zone the virtual positional marker is currently in. In some embodiments, the new zone can also be diagonal to the zone the virtual positional marker is currently in. In some embodiments, the new zone can be two zones away. In some embodiments, the distance the virtual positional marker can be moved may depend on the winning playable virtual entity's attributes or playable virtual entity effects, the gameplay mode, or other factor.

If a user wants to shoot a goal, then at block 226, the winning user, or winner, can choose to shoot the virtual positional marker towards the goal. At block 228, the interactive computing system 130 determines a probability of making a goal based on the zone the virtual positional marker is in, the adjusted OVR of the winning playable virtual entity, and/or the OVR of the losing user's goalie. In some embodiments, the losing user can pre-select a default goalie to be used whenever an opposing user shoots a goal. In some embodiments, the losing user can select a goalie to be used when a goal is being shot. In some embodiments, a goalie can have a preset OVR. In some embodiments, the goalie can have an OVR that changes based on certain playable virtual entity effects or user effects, for example.

At block 230, based on a determined probability of scoring a goal, the losing user, or loser, can select a determined number of blocking zones (e.g., 1-4) out of a total number of available blocking zones (e.g., 5). In some embodiments, the number of blocking zones can vary and the selectable blocking zones can also vary proportionally. The blocking zones also correspond to the shooting zones. In some embodiments, the number of blocking zones that can be selected by the loser is less than the total number of available blocking zones.

In some embodiments, the probability of scoring a goal can be based at least in part on the difference in OVR for the goalie as compared to a kicker (e.g., the winning playable virtual entity determined at block 220). For example, the higher the OVR of the kicker is as compared to the goalie, the higher the probability of scoring a goal. For example, if the difference between the kicker (e.g., OVR 12) and the goalie (e.g., OVR 9) is three OVR, then the kicker can get a scoring probability of 20% per OVR point difference, or 60% total. Thus, in the example illustrated in FIG. 8C, the goalie would be able to block 40% of the blocking zones, or two out of five blocking zones. In some embodiments, the probability of scoring a goal can also be based on the distance from the goal. For example, if a goal is being shot in the forward zones (e.g., the row or zones farthest from the user that is shooting), then there would be no penalty to the probability. Also, for example, if a goal is being shot from the midfield and forward zones (e.g., the row or zones second farthest from the user that is shooting), then a reduction (e.g., 20% or 40% or 60%) to the probability of scoring can be applied. In some embodiments, certain playable virtual entity effects and/or user effects can affect the reduction as well. In some embodiments, if the OVR difference is five or higher (e.g., the kicker has at least five more OVR than the goalie), then the goal probability is 100% and the losing user cannot select any blocking zones. In some embodiments, if the kicker OVR is the same as or lower than the goalie OVR, then the probability of a goal can be set to a preconfigured probability (e.g., 0%, 5%, 10%, 20%, etc.). If the preconfigured probability is less than 20% or the proportion of associated blocking zones (e.g., 1 of 5 zones), then the goal is determined automatically and no blocking zones or shooting zones will be selected. The chances of scoring a goal and blocking the yield 100%, and the chances are based on according to the following table, for example:

| OVR Difference | Goal Probability Based on Forward Row Shot | Number of Blocking Zones Available |
|---|---|---|
| 0 | 5% | N/A |
| 1 | 20% | 4 |
| 2 | 40% | 3 |
| 3 | 60% | 2 |
| 4 | 80% | 1 |
| 5+ | 100% | 0 |

At block 232, the interactive computing system 130 can receive a selection of one shooting zone from the winner.

At block 233, if the selected shooting zone from block 232 corresponds to one of the selected blocking zones then no goal is scored and the blocking user can gain possession of the virtual positional marker. However, if the selected shooting zone is different from the selected blocking zones, then a goal is scored and the virtual positional marker is reset at center field with the loser/blocker gaining possession of the virtual positional marker. In some embodiments, whether the goal is made or blocked, the loser will gain possession of the virtual positional marker. However, in some embodiments, for example, in some game modes, the winner may retain possession of the virtual positional marker upon scoring the goal. Additionally, in some embodiments, for example, the winner and loser may battle to retain possession of the virtual positional marker upon the blocking of a shot. Additionally, in some embodiments, for example, possession of the virtual positional marker may be randomly assigned (e.g., 50/50 or apportioned based on the goal percentage) upon the blocking of a shot.

At block 236, the interactive computing system 130 determines whether a termination condition has been satisfied, and if it has, the match ends at block 238. For example, if a certain number of goals have been scored, or if game time has run out, the game can be terminated at block 238 and a victor determined based on goals scored. In some embodiments, if the number of goals for the users are the same, then penalty kicks can be implemented repeating blocks 226-232 for each user to determine the victor based on the total number of goals scored. In some embodiments, the game can end as a tie. If a termination condition is not satisfied at block 236, then the process repeats from block 212. In some embodiments, there can be a count of battles pre-set and once the last battle ends, the user with the most goals will be the victor.

Example Game Features

Figure 3:
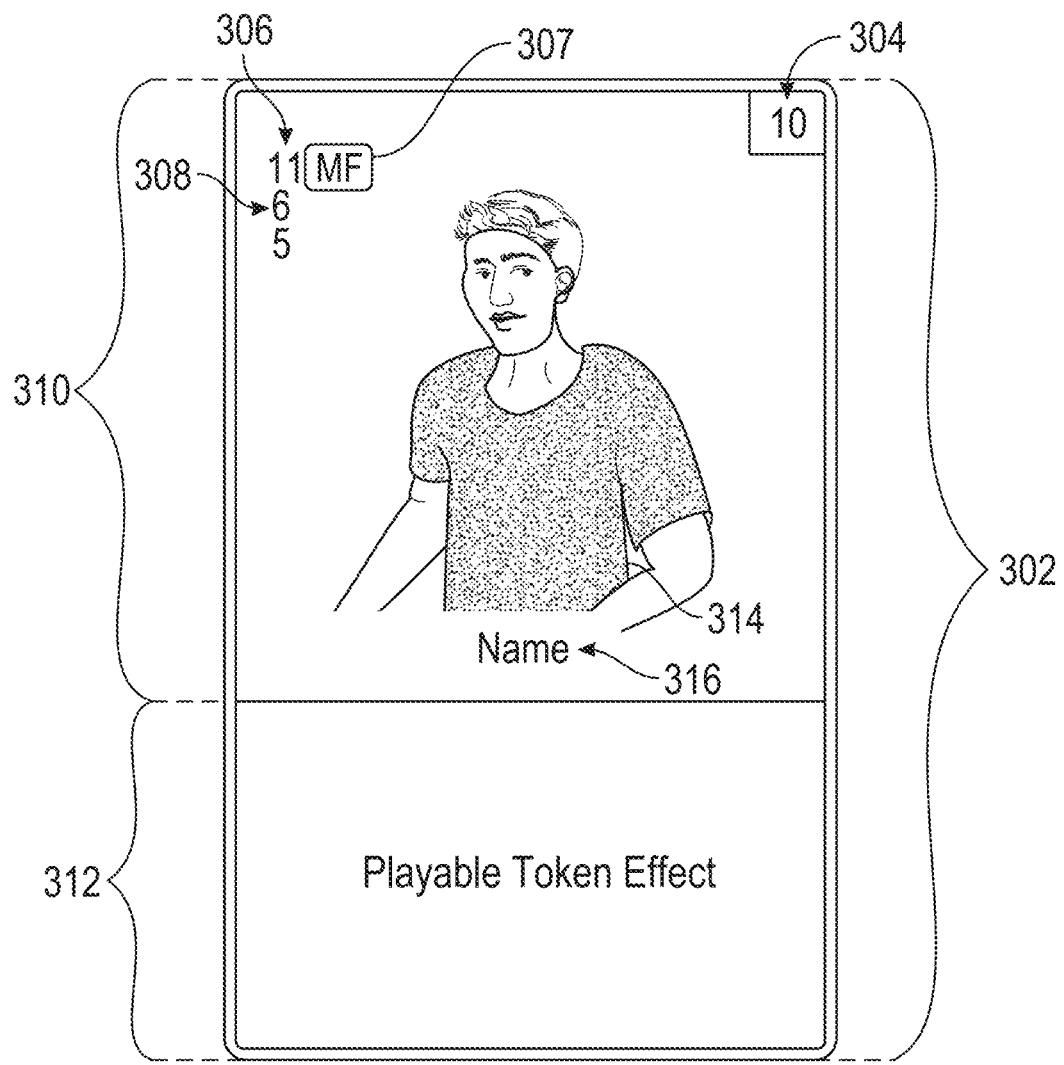
FIG. 3 illustrates an example embodiment of a playable virtual entity.

FIG. 3 illustrates an example embodiment of a playable virtual entity 302. In some embodiments, one or more playable virtual entity 302 can be used by users in a game with each playable virtual entity having its own unique playable virtual entity effect 312, salary value 304, OVR value(s) (e.g., 306, 308, 309), OVR position bonus indicator (e.g., 307), player image 314, player name 316, or other information that can be referred to during a game. In some embodiments, the playable virtual entity 302 can have overlapping information with other playable virtual entity 302. For example, multiple playable virtual entities can have the same OVR values, playable virtual entity effect 312, salary 304, or the like.

In some embodiments, the playable virtual entity 302 includes a description of a playable virtual entity effect 312, which can be the same or different for each playable virtual entity can include one or more effects as described herein. For example, such playable virtual entity effects 312 can include bonuses or limits to playable virtual entities played by a user or opponent, playable virtual entities held by the user or opponent, the user or opponent's ability to place playable virtual entities, or any other gameplay-related effect. The playable virtual entity 302 also includes a player section 310 that can include a player image 314 and player name 316. In some embodiments, the player image 314 and/or player name 316 can be based on real world athletes or people. In some embodiments, the player image 314 and/or player name 316 can be based on fictitious people or characters (e.g., cartoon characters from a video game, or the like).

In some embodiments, the playable virtual entity 302 includes a salary value 304. As described herein, in some embodiments, certain rules and requirements can be imposed on deck creation. For example, a certain point value, or salary value 304, can be assigned to each playable virtual entity 302. In some embodiments, a deck can limited by total salary of all playable virtual entities in the deck. For example, the salary value 304 of each playable virtual entity in a deck can be added together to yield a total salary. The interactive computing system 130, for example, can then impose a limit, or salary cap, for the decks so that the total salary is less than or equal to the salary cap. In some embodiments, the salary cap can vary based on game type (e.g., tournament mode, ranked game, unranked game, friendly game, or the like), when the game is played (e.g., during a weekend or holiday, or the like), based on user ranking, or based on user profile status (e.g., whether the profile is a standard profile, or the like), for example. In some embodiments, the salary cap is set and cannot be adjusted or changed. The salary cap results in users having to decide which expensive playable virtual entities, or playable virtual entities with high salaries, and which cheap playable virtual entities, or playable virtual entities with low salaries, to include in the deck so that the salary cap is not exceeded. It may be desired for a user to meet the salary cap, however, in some embodiments, a user may design a deck that has a total salary less than the salary cap.

In some embodiments, the playable virtual entity 302 includes OVR value(s) (e.g., 306, 308, and 309) and an OVR position bonus indicator (e.g., 307). The OVR value(s) can include a default OVR 309 the indicates the OVR value for the playable virtual entity 302 in any position that is not modified by an OVR position bonus. For example, a playable virtual entity 302 may have zero, one, two, or three OVR position bonuses associated with the playable virtual entity 302. In FIG. 3, playable virtual entity 302 has a midfield OVR position bonus 306 of 11, and another OVR position bonus 308. The other OVR position bonus 308 can appear in a color indicative of a defensive or offensive position bonus. The midfield OVR position bonus 306 can also appear in a color indicative of the midfield OVR position bonus. For example, a defensive OVR position bonus can appear in the color blue, an offensive OVR position bonus can appear in the color red, a midfield OVR position bonus can appear in the color green, and a default OVR can appear in the color black. In some embodiments, there can be as few as one OVR listed on playable virtual entity 302. The one OVR can be a default OVR or another OVR position bonus, for example. In some embodiments a playable virtual entity 302 can have as many as four OVR values listed (e.g., one defensive OVR position bonus value, one offensive OVR position bonus value, one midfield OVR position bonus 306 value, and one default OVR 309). In some embodiments, a playable virtual entity 302 can have two or three OVR values listed. In some embodiments, in addition or instead of using a specific color associated with an OVR position bonus position, an OVR position bonus indicator 307 can be shown near one or more of the OVR value(s) to indicate what field position the OVR value is applicable too. In FIG. 3, a midfield OVR position bonus indicator 307 is shown to indicate that the midfield OVR position bonus 306 of 11 is associated with the midfield position. Also, as described above, the midfield OVR position bonus 306 of 11 can also appear in the color green, for example, to indicate the midfield position. In some embodiments, the midfield OVR position bonus 306 of 11 cannot be colored green, or any color, and instead there can be a midfield OVR position bonus indicator 307 shown instead. In some embodiments, playable virtual entity 302, in at least some user interface configurations, can only show the relevant OVR value associated with the field value of where the playable virtual entity 302 is placed. For example, if the playable virtual entity 302 in FIG. 3 is placed in the midfield position, or a position that includes a midfield bonus along with another position bonus, then only the midfield OVR position bonus 306 of 11 can be displayed and the other OVR value(s) can be hidden from view.

Example User Interface Showing a Field

Figure 4:
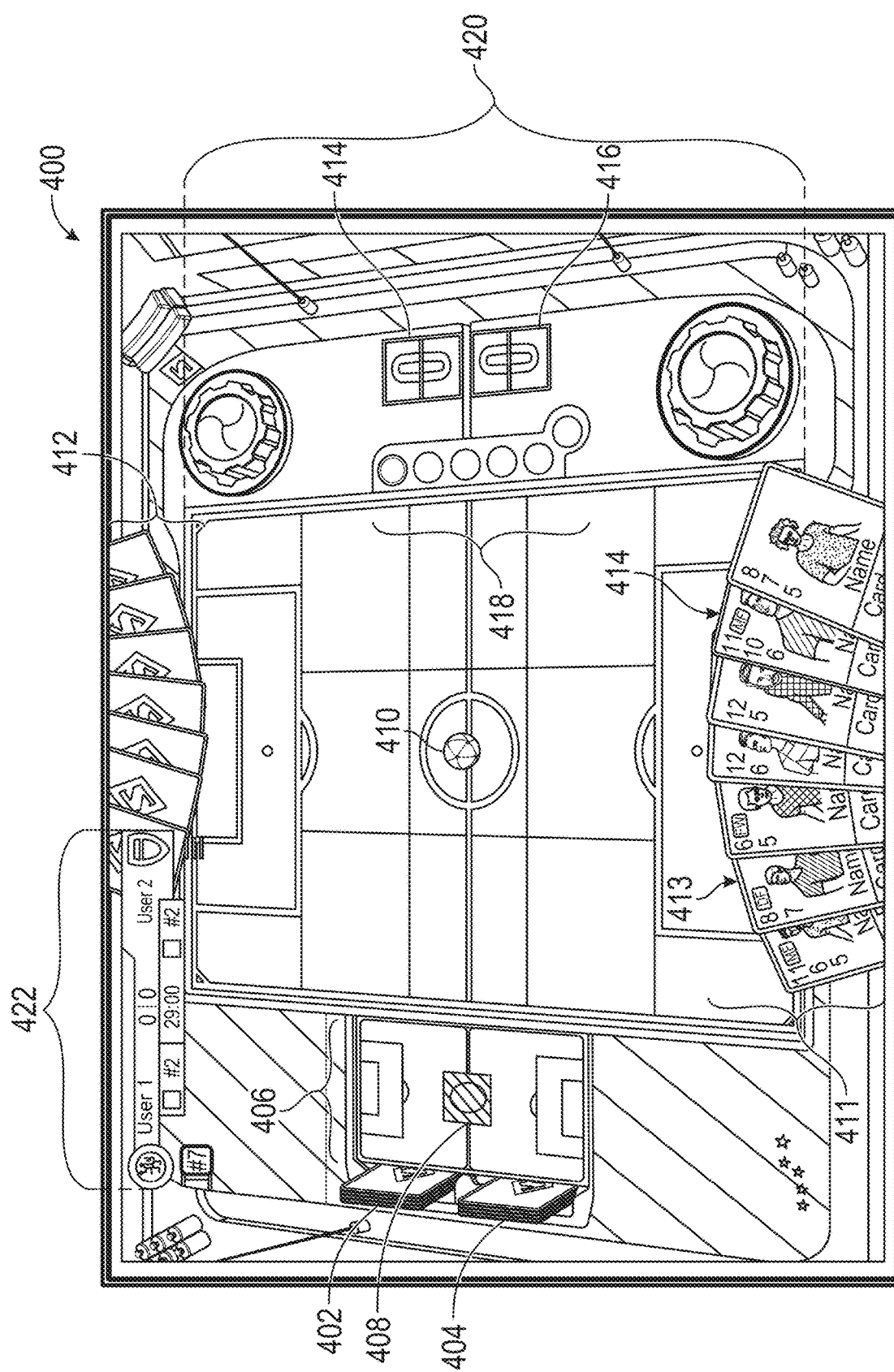
FIG. 4 illustrates an embodiment of a user interface of a game application.

FIG. 4 illustrates an embodiment of a user interface 400 for an example game, comprising two users, a field 420, a virtual positional marker 410, a round indicator 418, game information 422, a miniature field 406, a score counter for each user (e.g., 414 and 416) and hands with playable virtual entities corresponding to each user (e.g., 411 and 412).

In some embodiments, a user viewing the user interface 400 can view the front faces of the playable virtual entities (e.g., the playable virtual entity 302 in FIG. 3) in the user's deck 411, as well as the backside of each of the playable virtual entities in the opponent's deck 412. The playable virtual entities in the user's deck 411 (e.g., playable virtual entities 413 and 414) can be interacted with by the user to view more information about each playable virtual entity.

In some embodiments, and as described in more detail herein, the field 420 can include a plurality of zones and the zones can each be associated with one or more field state positions. For example, for a soccer game such as illustrated in FIG. 4, there can be 15 zones. In some embodiments, each row and/or each zone can have its own field state. In some embodiments, the row with three zones farthest from the user would be a forward position field state for that user; so that when a virtual positional marker is in one of these zones then the field state position would be for a forward for that user. The same row, however, would be a defense position field state for the opposing user because from their point of view, they would be defending and the row would be closest to the opposing user. The second to farthest row with three zones from the user would be a mixed forward and midfield position field state. The middle row, third farthest from the user, with three zones would be a midfield position field state. The second closest row with three zones would be a mixed defense and midfield field state. Finally, the closes row would be a defense field state. So, if a virtual positional marker is in one of these rows in one of the zones then the particular field state would apply to playable virtual entities placed in battles and/or when shooting a goal. In. FIG. 4, the virtual positional marker 410 is in the centerfield of the field 420, which would be associated with a midfield position field state. In some embodiments, the virtual positional marker 410 affects the which OVR value is in effect during a battle, as described in more detail below with respect to FIG. 5.

In some embodiments, the user interface 400 can include a round indicator 418, which is used to keep track of the number of battles that have taken place during the game. In some embodiments, after a certain number of rounds or battles, the game may end and a winner may be determined. In some embodiments, after a certain number of rounds or battles, if there is a tie, the game may enter sudden death or penalty kicks to determine a winner. In some embodiments, there can be no limit to the number of rounds or battles. In some embodiments, a game may end and a winner determined if one or more of the following criteria are met: the number of rounds or battles reaches a preconfigured limit, the time for the game runs out, a certain number of goals are scored by one or both users, a certain number of playable virtual entities are played, or any similar criteria based on a combination of playable virtual entities played, goals scored, or time passed.

In some embodiments, the user interface 400 can include game information 422 that displays the total number of time passed since the start of the game and/or how much time is left in the game, the names associate with each user or each user's team, team emblems or symbols, player number or name that is currently active (if any), or the like. In some embodiments, the user interface 400 can exclude information. For example, remaining time may not be apparent from the user interface 400. In some embodiments, the user interface 400 can include information that is indicative of a phase of a game (e.g., first half, first quarter, third period, or the like). In some embodiments, the game information 422 can be shown on the user interface 400 in various section. For example, the information can be split apart and appear in different areas (e.g., the top-left, bottom-left, bottom-right, or the like) of the user interface. For example, each user's name may appear next to the respective user's hand.

In some embodiments, the user interface 400 can include a score counter for each user (e.g., 414 and 416). For example, score counter 416 would indicate the number of goals scored by the user viewing user interface 400, and score counter 414 would indicate the number of goals scored by the user's opponent.

In some embodiments, the user interface 400 can include a miniature field 406. In some embodiments, the miniature field can be displayed throughout the game, as a reference point for the users to view during battles, for example. The miniature field 406 can include a similar layout to the field 420 and a virtual positional marker indicator 408 showing the position of the virtual positional marker 410 by highlighting, shading, or coloring the appropriate zone. For example, in FIG. 4, the virtual positional marker 410 is in the centerfield of the field 420 and the virtual positional marker indicator 408 is similarly in the centerfield of the miniature field 406.

In some embodiments, the user's deck 404 and the opponent's deck 402 can be shown on the user interface 400 as a reference for each user to see how many playable virtual entities are left in the deck for each user. In some embodiments, the user interface 400 can exclude the deck information (e.g., 402 and 404). For example, a remaining count of cards in a hand or deck for each user and/or the user's opponent may not be apparent from the user interface 400.

Example User Interface for a Battle

Figure 5:
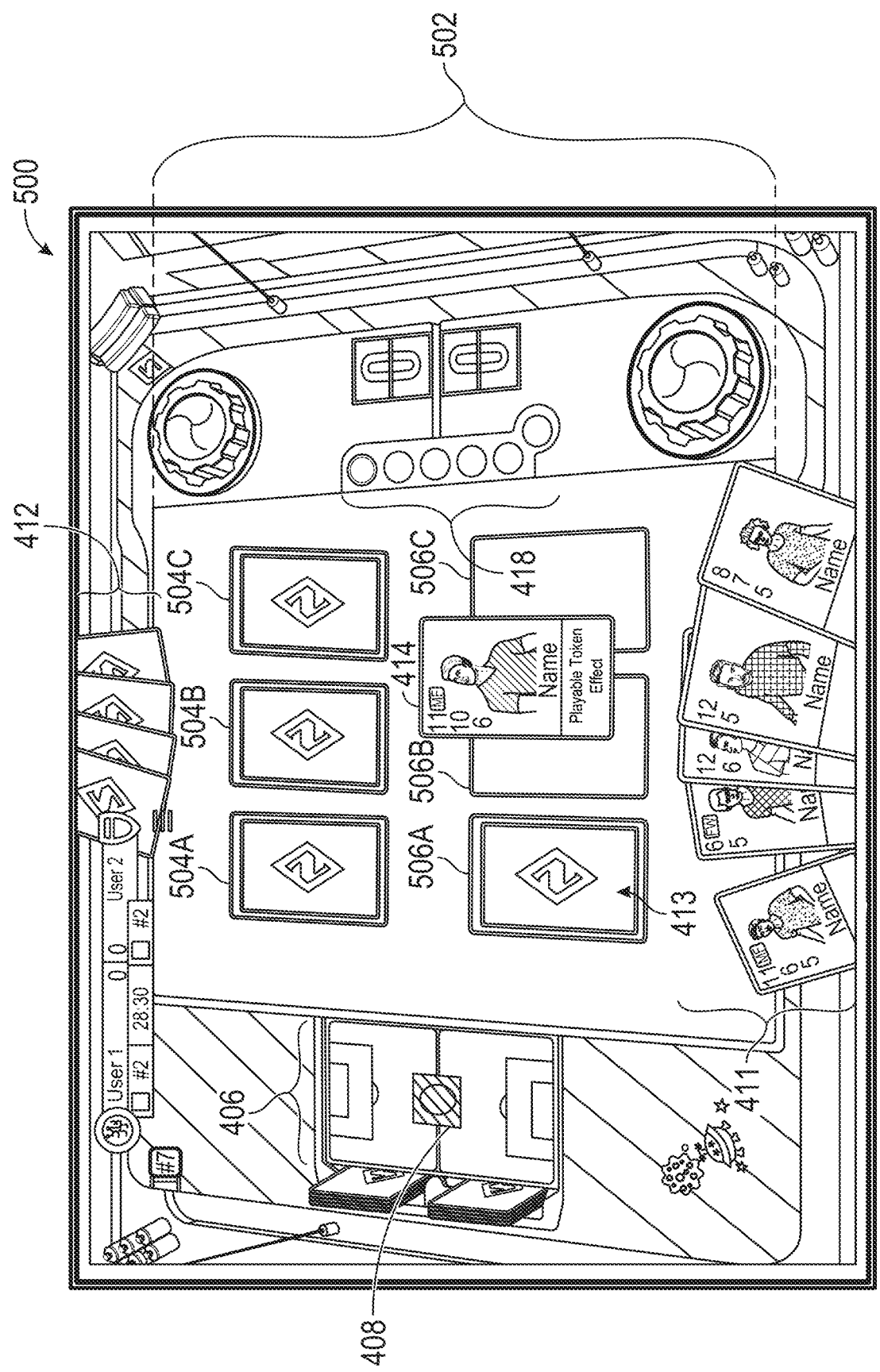
FIG. 5 illustrates an embodiment of a user interface of the game application, showing a battle setup.

FIG. 5 illustrates an embodiment of a user interface 500 for the example game, showing a battle setup. In some embodiments, a battle can be displayed on the field 502. The field 502 can allow for a placement of up to a defined number of playable virtual entities (e.g., zero to three cards) to be placed down by each user on the field 502. For example, the user can place playable virtual entities in positions 506A, 506B, and/or 506C. In addition, the user's opponent can place playable virtual entities in positions 504A, 504B, and/or 504C. In FIG. 5, the first player's opponent went first and placed three playable virtual entities face down in positions 504A, 504B, and/or 504C. After the user's opponent finished placing the playable virtual entities and finishing the turn, the user can place playable virtual entities down in positions 506A, 506B, and/or 506C. In FIG. 5, the user has placed playable virtual entity 413 down, face down, and is considering placing down playable virtual entity 414.

In some embodiments, after a playable virtual entity is placed it may remain face-up or face-down. For example, it may be beneficial to view all playable virtual entities, even when placed down in positions 506A, 506B, and/or 506C to compare the playable virtual entities as strategy is being considered. In some embodiments, it may be desired to display the playable virtual entities as face-down once they are played so that the game can simulate what it would be like to play the game in the real world. In addition, depending on the game mode or type, once a playable virtual entity is played it may not be viewed again, and users must be careful in placing playable virtual entities in positions 506A, 506B, and 506C and/or remember what playable virtual entities are placed.

Figure 6:
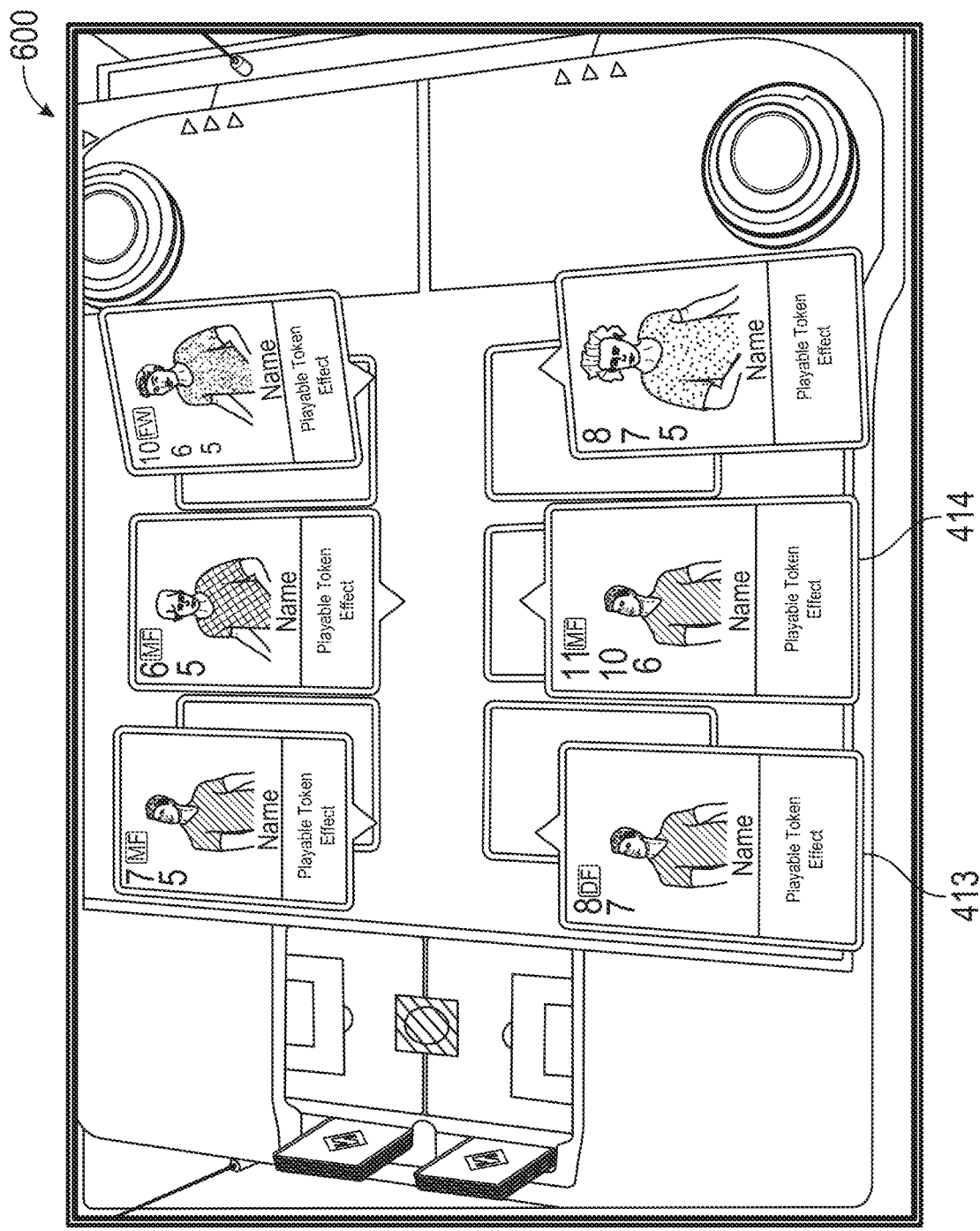
FIG. 6 illustrates an embodiment of user interface of the game application, showing a completion of the battle.

Turning now to FIG. 6, which illustrates an embodiment of a user interface 600, which shows how user interface 500 of FIG. 5 is updated after both users place their playable virtual entities and end their turns, showing a completion of the battle. FIG. 6 shows that the user has placed 3 playable virtual entities, including the playable virtual entities 413 and 414 shown in FIG. 5. Once the users place their playable virtual entities down and both turns end and the playable virtual entities are flipped over. The playable virtual entity effects for each playable virtual entity are applied to all playable virtual entities that are flipped over in FIG. 6 to determine the adjusted OVR values for the playable virtual entities. Once the adjusted OVR values are determined, then the playable virtual entity with the highest OVR for each user is compared to determine a winner of the battle, such that the winner of the battle will be the user with the playable virtual entity having the highest OVR value. In FIG. 6, playable virtual entity 414 appears to have the highest OVR value of 11 and the user would win the battle and can either shoot the virtual positional marker towards the goal or move the virtual positional marker, as shown in FIG. 7.

Figure 7:
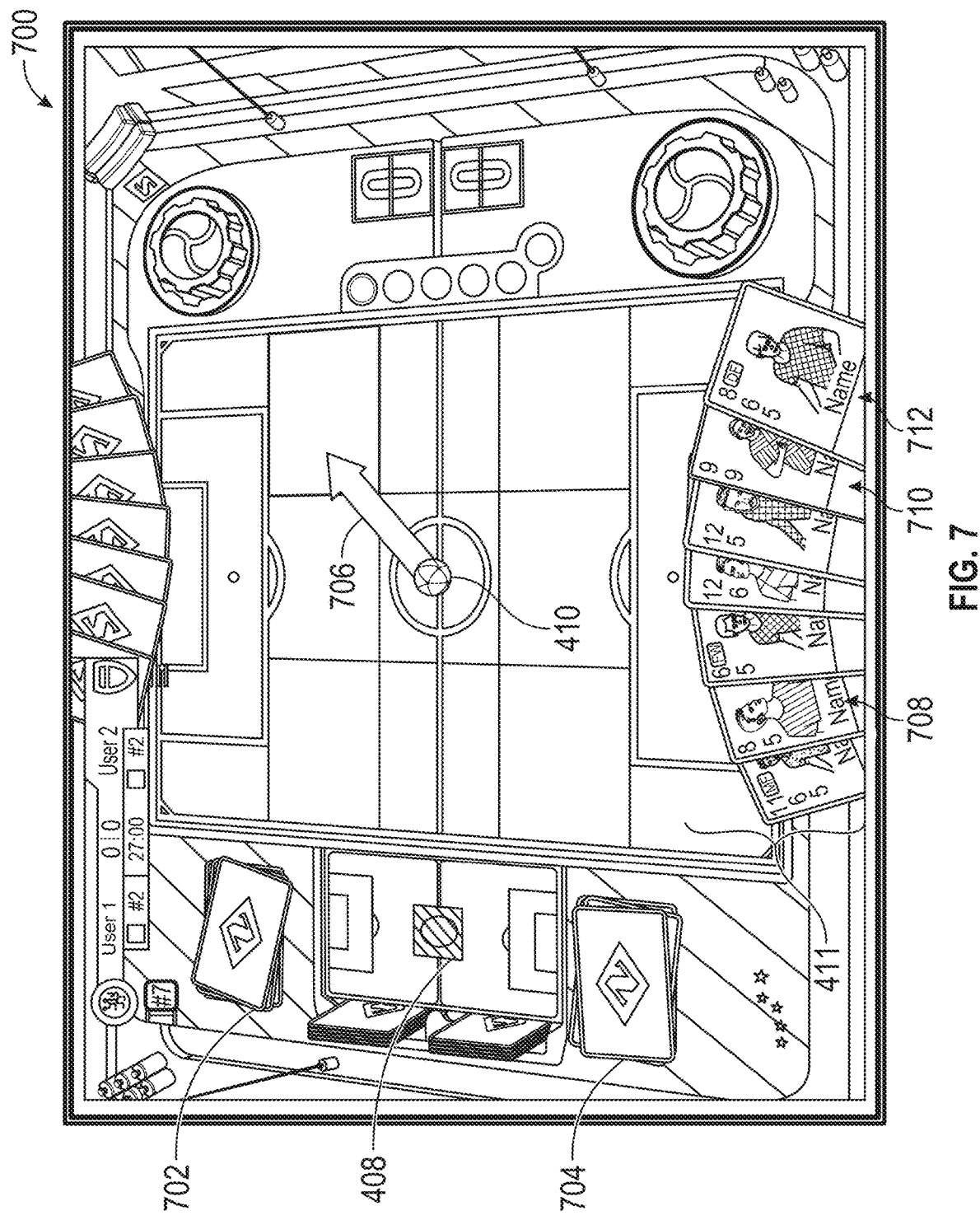
FIG. 7 illustrates an embodiment of the user interface of FIG. 4, incorporating the results of the battle depicted in FIGS. 5-6 by allowing a winner to control movement of a virtual positional marker.

FIG. 7 illustrates an embodiment of a user interface 700 that is based on user interface 400 of FIG. 4, incorporating the results of the battle depicted in FIGS. 5-6 by allowing the winner (e.g., the user) to control movement of the virtual positional marker. In FIG. 7, the user, or winner, can select a zone to move the virtual positional marker to as desired by the winner. Once the zone is selected, and the virtual positional marker moved, the round ends and round indicator increases by one (e.g., another circle can light up), and the next round begins. For example, the round can begin at user interface 400 in FIG. 4, but with the virtual positional marker 410 in the new location as determined by the user in FIG. 7. In some embodiments, the playable virtual entities played in the battle in FIG. 6 can be discarded into discard piles 702 and 704, and new playable virtual entities can be drawn prior to, or after the virtual positional marker has moved and prior to the next round. In some embodiments, there can be no discard pile and the playable virtual entities can be placed back into the deck at the bottom or randomly in the middle. In some embodiments, the discard pile can grow until the deck is depleted (e.g., decks 402 and 404 in FIG. 4, if present in the user interface 700), and once depleted, the associated user enters a depleted deck status and the discard pile becomes the pile which the associated user then draws playable virtual entities from. For example, the associated user, once in a depleted deck status, can draw cards from the discard pile at random. In some embodiments, the discard pile can be excluded from the user interface 700 and an indicator or notification (e.g., a popup, a sound, a color, a button effect, or the like) can be used to indicate to the user and/or opponent when the user and/or opponent has entered depleted deck status. For example, in some embodiments, a user may be notified when they enter depleted deck status but the user's opponent may not receive a notification. Additionally, in some embodiments, a user may be notified when they enter depleted deck status and the user's opponent may also receive a similar notification. In some embodiments, the discard pile can grow until the deck is depleted (e.g., decks 402 and 404 in FIG. 4), and once depleted, the discard pile can be shuffled and be the new deck to draw playable virtual entities from, and placed back in positions 402 and 404.

Example User Interface for Shooting a Goal

Figure 8A:
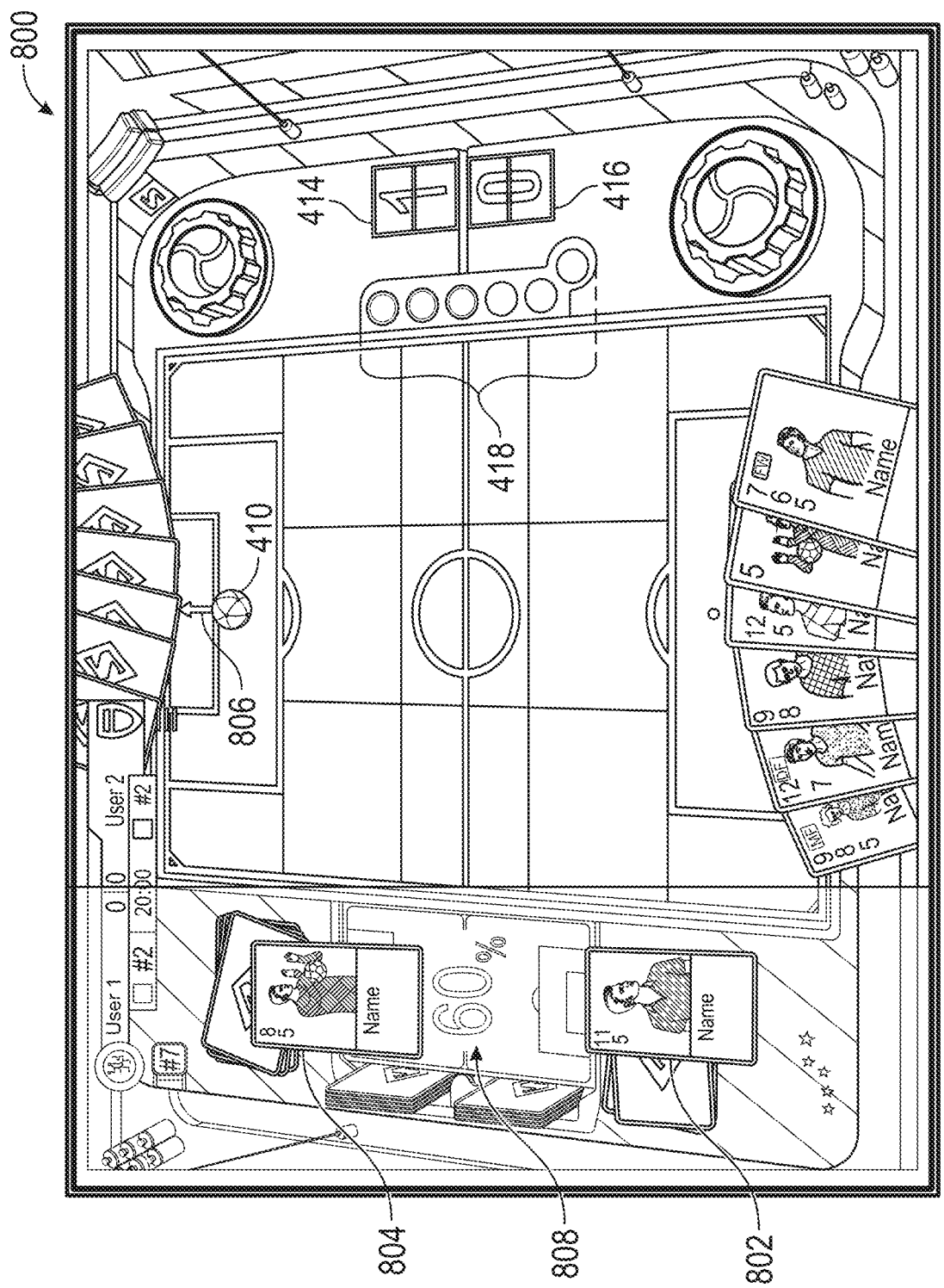
FIG. 8A illustrates an embodiment of the user interface of FIG. 4, allowing a user to shoot a goal.

FIG. 8A illustrates an embodiment of a user interface 800 based on user interface 400 of FIG. 4, allowing a user to shoot a goal. For example, FIG. 8A would occur after the virtual positional marker 410 was moved into the enter zone near the user's opponent's goal, a battle occurs similar to FIGS. 5-6, the user wins the battle, and the user then decides to shoot a goal, as indicated by the arrow. In FIG. 8A, once the user indicates a desire to shoot a goal, the user interface 800 can update the miniature field to allow the user to indicate which kicker/playable virtual entity to user against the opponent. After the playable virtual entity is chosen and placed, the opponent's goalie and the chosen kicker/playable virtual entity can be displayed. The interactive computing system 130 can then determine a goal percentage based on the difference between the OVR value of the goalie and the OVR value of the kicker. In FIG. 8A, the difference is three and the percent change of making a goal is 60%, as shown by the goal chance indicator 808. More information related to shooting goals is included herein. FIG. 8A is also occurring sometime after the round shown in FIGS. 4-7, and the round indicator shows that 3 rounds passed. Also, the goal indicator 414 shows that the opponent has scored one goal during the game.

Figure 8B:
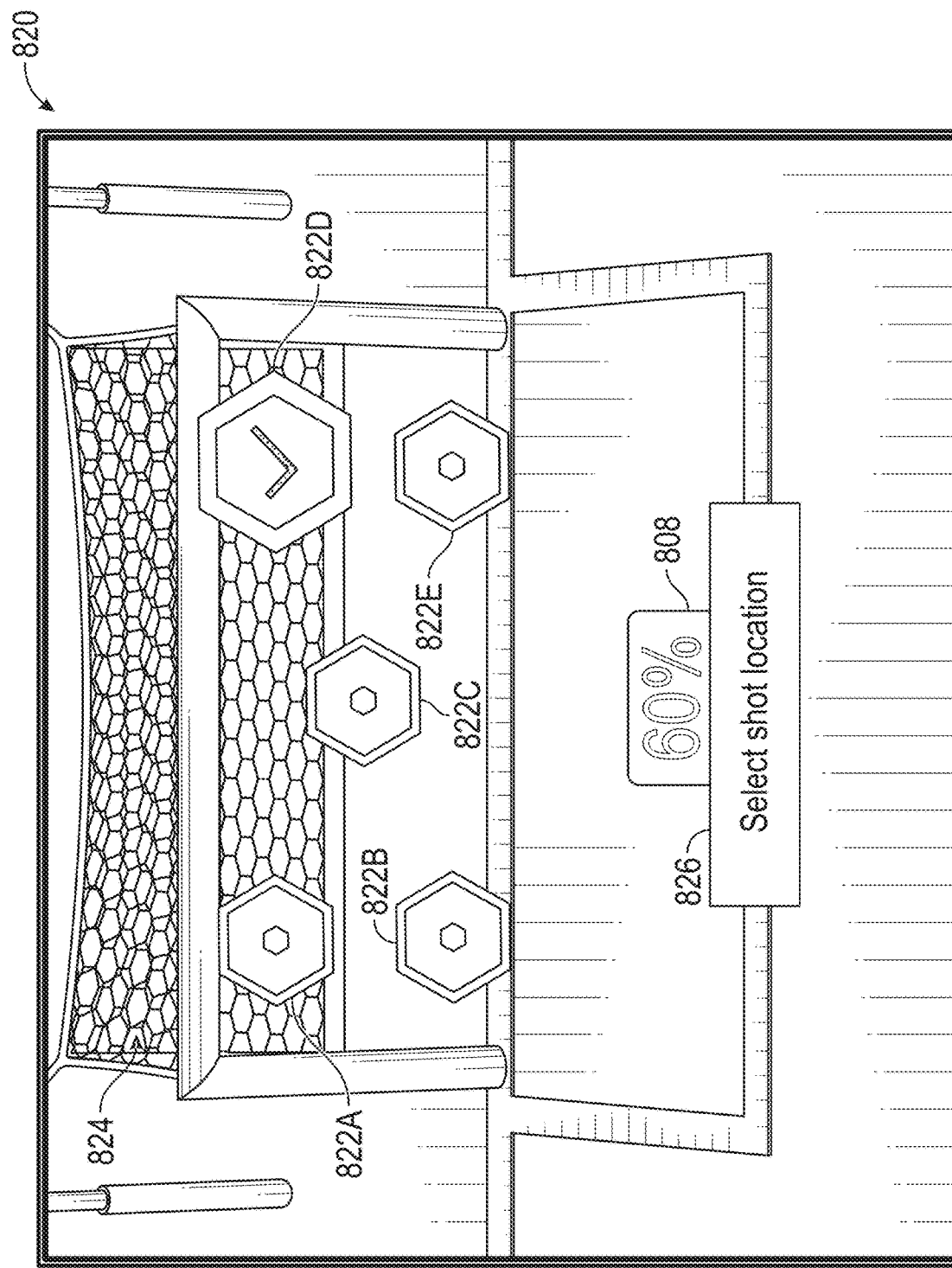
FIG. 8B illustrates an embodiment of a user interface of the game application for shooting a goal.

FIG. 8B illustrates an embodiment of a user interface 820 allowing the user to kick a goal against the opponent. For example, the percent change of making a goal is also shown in the goal chance indicator 808. In some embodiments, instructions 826 can be displayed to the user indicating to the user that the user can select one shooting location (e.g., shooting locations 822A, 822B, 822C, 822D, and 822E) to shoot the virtual positional marker to. In some embodiments, the instructions 826 can include a description of the odds of making a goal, what the user should do, and any limitations imposed. User interface 820 indicates that the user selected shooting location 822D.

Figure 8C:
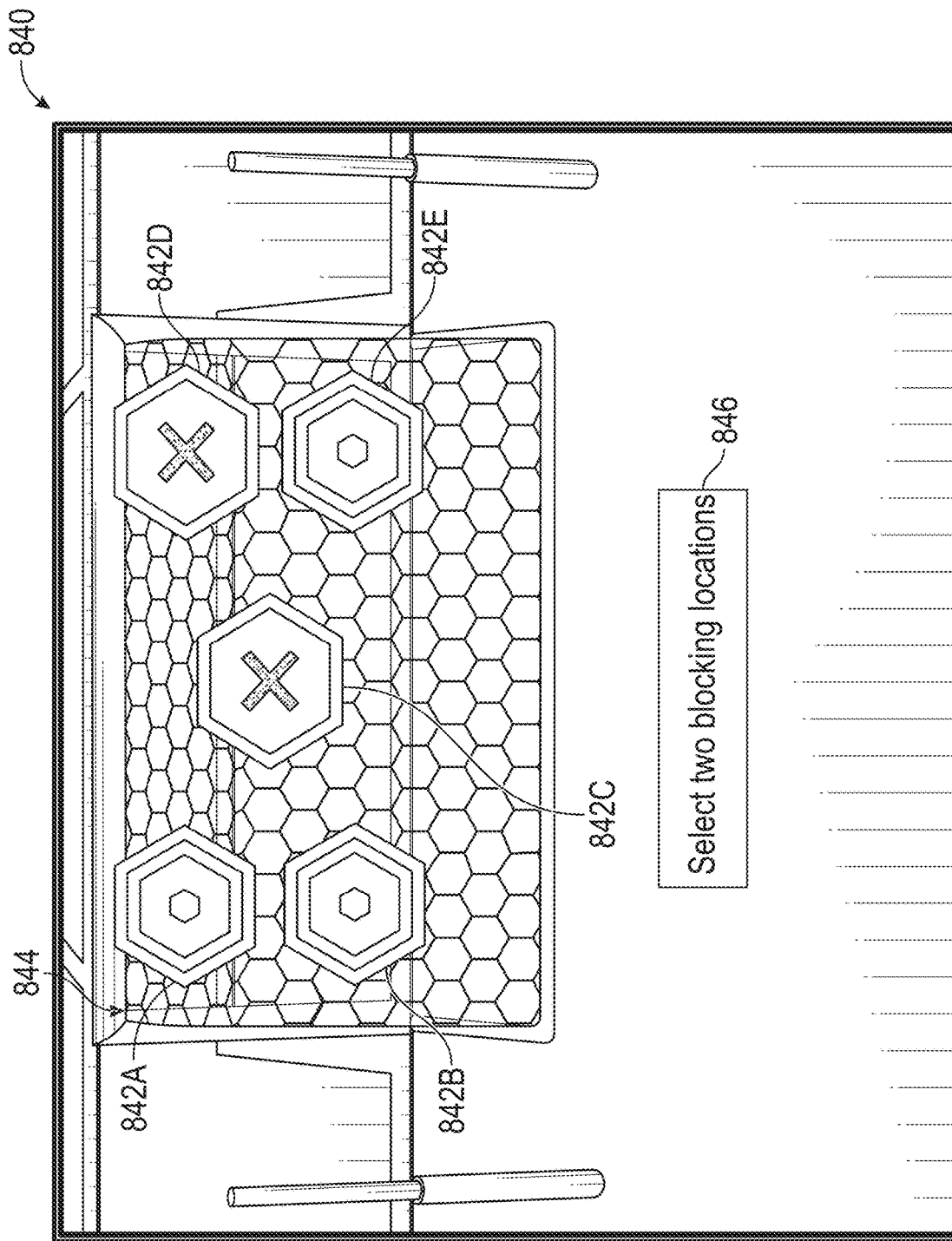
FIG. 8C illustrates an embodiment of a user interface of the game application for defending against a shot on goal.

FIG. 8C illustrates an embodiment of a user interface 840, allowing the opponent to block a virtual positional marker that is kicked by the user in FIG. 8B. For example, since the likelihood if making a goal is 60%, then out of five locations, the opponent can only select two blocking locations (e.g., blocking locations 842A, 842B, 842C, 842D, and 842E) so that the likelihood of blocking the goal is only 40%. The blocking locations (e.g., blocking locations 842A, 842B, 842C, 842D, and 842E) correspond to the shooting locations (e.g., shooting locations 822A, 822B, 822C, 822D, and 822E) in FIG. 8B. User interface 840 indicates that the opponent selected blocking locations 842C and 842D. Since the user selected 822D in FIG. 8B, and the opponent selected blocking location 842D as one of the locations to block, then the virtual positional marker will be blocked and the user will not score a goal. In some embodiments, the instructions 846 can include a description of the odds of making a goal, what the user should do, and any limitations imposed.

Game Process from Perspective of a Server

Figure 9:
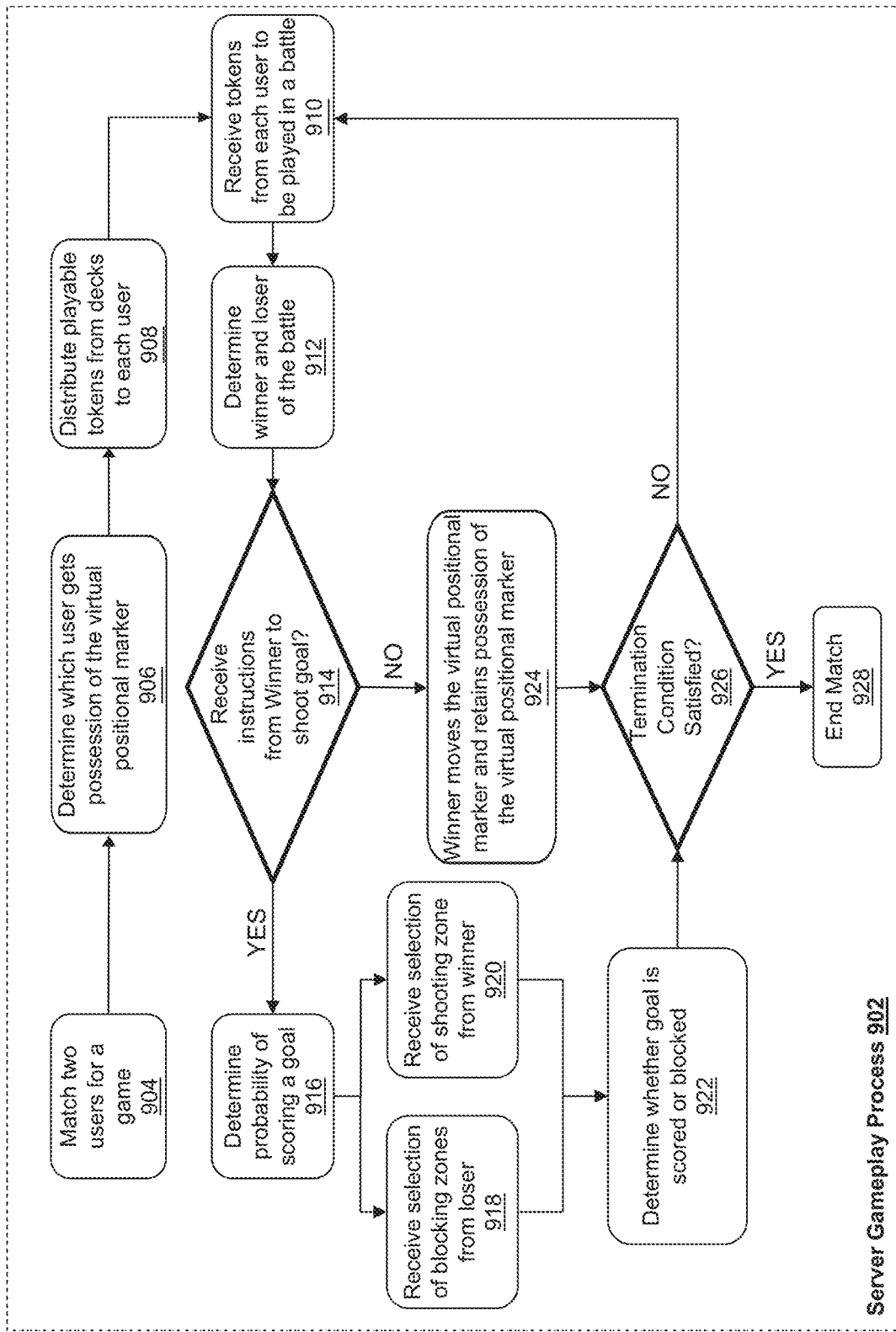
FIG. 9 illustrates an embodiment of a flowchart of a gameplay process for executing a video game with playable virtual entities within a virtual environment of a game application.

FIG. 9 illustrates an embodiment of a flowchart of a server gameplay process 902, from the perspective of a server, for executing a virtual game within a virtual environment of a game application. The gameplay process 902 can be implemented by any system that can generate instances of the game application. For example, the gameplay process 902, in whole or in part, can be implemented by the systems, methods, or components described herein. The gameplay process 902 is similar to the gameplay process 202 as described in FIG. 2. For examples, some of the functions and capabilities of the gameplay process 902 are described in more detail with respect to gameplay process 202 in FIG. 2

At block 904, the interactive computing system 130, for example, matches two users for a game based at least in part on user data, as described in more detail herein. In some embodiments, certain matching criteria can be used to match a user with an opponent user, or opponent. The matching criteria can include one or more of the following matching factors: a user's physical location, a user's default or primary language, a user's preconfigured location or region, a user's internet connection speed, a user device's processing power, a user's device information (e.g., operating system, processor speed, display type, or the like), a user's gameplay data (e.g., win rate, lose rate, win/lose rate associated with specific fields or decks used by the user or an opponent, or the like), the amount of time passed from the initiation of a request to match, a gameplay mode for the requested match, or any other relevant criteria for matching. The matching criteria or matching factors can also be weighted to improve the quality of the matches (e.g., adjustments can be made based on games played or any other user-related data), or weighted over time (e.g., if a user is waiting a long time to be matched, the criteria weightings can be adjusted to allow for a less stringent matching and allow the user to match with a broader range of other users).

At block 906, the interactive computing system 130 determines which user gets initial possession of a virtual positional marker. In some embodiments, one or more methods can be applied to determine the initial possession, such as: a simulated coin flip or other representation of a random number generator; user ranking; who joined the game first; who hosted the game; or other criteria.

At block 908, the interactive computing system 130 distributes playable virtual entities to each user from each user's preconfigured deck and places the playable virtual entities into each user's hand so that each user can view the front of their own playable virtual entities but the back of the opponent's playable virtual entities.

At block 910, the interactive computing system 130 receives from the user that has possession of the virtual positional marker (e.g., as determined at block 906, 922, or 924, for example) a placement of playable virtual entities (e.g., zero to three playable virtual entities) on a virtual battlefield face down.

At block 912, the interactive computing system 130 will determine the winner and loser of the battle. In some embodiments, once the user places its placement of playable virtual entities on the virtual battlefield, the interactive computing system 130 then receives from the opponent a placement of playable virtual entities face down on the virtual battlefield. Then, once both users have placed their respective playable virtual entities on the virtual battlefield face-down, the interactive computing system 130 turns the playable virtual entities face up at the same time so that both users can view the front of the playable virtual entities. After, or concurrently with flipping the playable virtual entities over at block 912, the interactive computing system 130 determines an adjusted OVR for each of the playable virtual entities placed down by the users for the battle based at least in part on one or more of: any playable virtual entity effects associated with the placed down playable virtual entities; any applicable user effects; location of the virtual positional marker; number of playable virtual entities held by one or both users, or any other factors. Then, the interactive computing system 130 compares the adjusted OVR of the playable virtual entities played to determine the playable virtual entity with the highest adjusted OVR for each user. Then, the interactive computing system 130 compares the playable virtual entity with the highest adjusted OVR for each user to determine who wins the battle.

At block 914, the interactive computing system 130 received instructions from the winner indicating whether the winner wants to shoot a goal or move the virtual positional marker to a new location on the field.

If the instructions indicate that the winner does not want to shoot a goal and wants to move the virtual positional marker to a new zone, then at block 924, the instructions can further indicate a new zone to move the virtual positional marker to as desired by the winner.

If the instructions indicate that the winner wants to shoot a goal, then at block 916, the interactive computing system 130 determines a probability of a making a goal.

At block 918, the interactive computing system 130 can receive a selection of blocking zones from the winning user. The number of blocking zones can be based on the probability of making the goal, as determined at block 916.

At block 920, the interactive computing system 130 can receive a selection of one shooting zone from the winning user.

At block 922, if the selected shooting zone from block 920 corresponds to one of the selected blocking zones from block 922, then no goal is scored and the blocking user can gain possession of the virtual positional marker. However, if the selected shooting zone is different from the selected blocking zones, then a goal is scored and the virtual positional marker is reset at center field with the loser/blocker gaining possession of the virtual positional marker.

At block 926, the interactive computing system 130 determines whether a termination condition has been satisfied, and if it has, the match ends at block 928. However, if a termination condition is not satisfied at block 926, then the process repeats from block 910. In some embodiments, there can be a count of battles pre-set and once the last battle ends, the user with the most goals will be the victor.

Example Hardware Configuration of Player System

FIG. 10 illustrates an embodiment of a hardware configuration for an interactive computing system 130 described herein. Other variations of the interactive computing system 130 may be substituted for the examples explicitly presented herein, such as removing or adding components to the interactive computing system 130. The interactive computing system 130 may include a dedicated game device, a smart phone, a tablet, a personal computer, a desktop, a laptop, a smart television, a car console display, and the like.

As shown in system configuration 10, the interactive computing system 130 includes a processing unit 20 that interacts with other components of the interactive computing system 130 and components external to the interactive computing system 130. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The interactive computing system 130 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the interactive computing system 130 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics-processing unit, which may be embedded into a motherboard and which is sometimes referred to as an on-board graphics chip or device.

The interactive computing system 130 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for computing device 800. Processing unit 20 can communicate through I/O 32 to store data, such as game state data and any shared data files. In addition to storage 40 and removable storage media 44, computing device 800 is also shown including ROM (Read-Only Memory) 46 and RAM 48. RAM 48 may be used for data that is accessed frequently, such as when a game is being played.

User I/O 34 is used to send and receive commands between processing unit 20 and player systems, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing device 800 on a display device, such as graphics, user interfaces, video, and/or other visual content. The interactive computing system 130 may comprise one or more integrated displays configured to receive display output signals produced by the display I/O 36, which may be output for display to a user. According to some embodiments, display output signals produced by the display I/O 36 may also be output to one or more display devices external to the computing device 800.

The interactive computing system 130 can also include other features that may be used with a game, such as a clock 50, flash memory 52, and other components. An audio/video player 56 might also be used to play a video sequence, such as a movie. It should be understood that other components may be provided in the interactive computing system 130 and that a person skilled in the art will appreciate other variations of the interactive computing system 130.

Program code can be stored in ROM 46, RAM 48, or storage 40 (which might comprise hard disk, other magnetic storage, optical storage, solid-state drives, and/or other nonvolatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game, and portions thereof might also be reserved for frame buffers, game state, and/or other data needed or usable for interpreting user input and generating game displays. Generally, RAM 48 is volatile storage and data stored within RAM 48 may be lost when the interactive computing system 130 is turned off or loses power.

As interactive computing system 130 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
one or more processors configured with computer executable instructions that cause the one or more processors to execute a game application for playing a video game, the game application configured to:
facilitate a connection between a first user device corresponding to a first user and a second user device corresponding to a second user;
generate and transmit, to the first user device, instructions for display of a first interactive user interface comprising a shared portion and a first portion;
generate and transmit, to the second user device, instructions for display of a second interactive user interface comprising the shared portion and a second portion;
receive, from the first user device, a first placement of first virtual entities on the shared portion;
transmit, to the second user device, instructions for display of the first placement of the first virtual entities; and
receive, from the second user device, a request to modify a marker location, wherein the marker location is associated with a location of a virtual positional marker.

2. The system of claim 1, wherein virtual entity information associated with the first virtual entities comprises information associated one or more sets of playable virtual entities.

3. The system of claim 1, wherein the first user is associated with first user profile data and the second user is associated with second user profile data.

4. The system of claim 1, wherein the facilitating of the connection between the first user device and the second user device is based at least in part on a matching of the first user and the second user.

5. The system of claim 1, wherein the game application is further configured to:
receive, from the second user device, a second placement of second virtual entities on the shared portion; and
transmit, to the first user device, instructions for display of the second placement of the second virtual entities.

6. The system of claim 1, wherein the game application is further configured to:
determine and assign a turn priority to the first user device prior to receiving the first placement of the first virtual entities; and
after receiving the first placement of the first virtual entities, and prior to receiving the request to modify the marker location, assign the turn priority to the second user device based at least in part on the first placement of the first virtual entities and a second placement of second virtual entities.

7. The system of claim 6, wherein the turn priority is based on possession of the virtual positional marker.

8. The system of claim 1, wherein the game application is further configured to:
modify the marker location based at least in part on the request to modify the marker location.

9. The system of claim 1, wherein the second portion is different from the first portion.

10. The system of claim 1, wherein the instructions for display of the first placement of the first virtual entities further includes:
instructions for displaying the first virtual entities face down in the second interactive user interface so that virtual entity information associated with the first virtual entities is not viewable by the second user.

11. A computer-implemented method comprising:
facilitating a connection between a first user device corresponding to a first user and a second user device corresponding to a second user;
generating and transmitting, to the first user device, instructions for display of a first interactive user interface comprising a shared portion and a first portion;
generating and transmitting, to the second user device, instructions for display of a second interactive user interface comprising the shared portion and a second portion;
receiving, from the first user device, a first placement of first virtual entities on the shared portion;
transmitting, to the second user device, instructions for display of the first placement of the first virtual entities; and
receiving, from the second user device, a request to modify a marker location, wherein the marker location is associated with a location of a virtual positional marker.

12. The computer-implemented method of claim 11, wherein virtual entity information associated with the first virtual entities comprises information associated one or more sets of playable virtual entities.

13. The computer-implemented method of claim 11, wherein the first user is associated with first user profile data and the second user is associated with second user profile data.

14. The computer-implemented method of claim 11, wherein the facilitating of the connection between the first user device and the second user device is based at least in part on a matching of the first user and the second user.

15. The computer-implemented method of claim 11, further comprising:
receiving, from the second user device, a second placement of second virtual entities on the shared portion; and
transmitting, to the first user device, instructions for display of the second placement of the second virtual entities.

16. The computer-implemented method of claim 11, further comprising:
determining and assigning a turn priority to the first user device prior to receiving the first placement of the first virtual entities; and
after receiving the first placement of the first virtual entities, and prior to receiving the request to modify the marker location, assigning the turn priority to the second user device based at least in part on the first placement of the first virtual entities and a second placement of second virtual entities.

17. The computer-implemented method of claim 16, wherein the turn priority is based on possession of the virtual positional marker.

18. The computer-implemented method of claim 11, further comprising:
modifying the marker location based at least in part on the request to modify the marker location.

19. The computer-implemented method of claim 11, wherein the second portion is different from the first portion.

20. The computer-implemented method of claim 11, wherein the instructions for display of the first placement of the first virtual entities further includes:

instructions for displaying the first virtual entities face down in the second interactive user interface so that virtual entity information associated with the first virtual entities is not viewable by the second user.

\* \* \* \* \*